US012568144B2

(12) United States Patent
Urmanov et al.

(10) Patent No.: US 12,568,144 B2
(45) Date of Patent: Mar. 3, 2026

(54) ASSURANCE OF USER BEHAVIORAL PATTERNS IN SOFTWARE APPLICATIONS WITH QUASI-SUPERVISED CLUSTERING

(71) Applicant: ORACLE INTERNATIONAL CORPORATION, Redwood Shores, CA (US)

(72) Inventors: Aleksey Urmanov, San Diego, CA (US); Felix Schmidt, Niederweningen (CH); Daniel P. Kleber, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 107 days.

(21) Appl. No.: 18/663,920

(22) Filed: May 14, 2024

(65) Prior Publication Data

US 2025/0358337 A1    Nov. 20, 2025

(51) Int. Cl.
　H04L 67/1396　　(2022.01)
　G06F 18/23213　　(2023.01)
(52) U.S. Cl.
　CPC .... H04L 67/1396 (2022.05); G06F 18/23213 (2023.01)
(58) Field of Classification Search
　CPC ..................... H04L 67/1396; G06F 18/23213
　See application file for complete search history.

(56) References Cited

U.S. PATENT DOCUMENTS

| | | | |
|---|---|---|---|
| 9,147,167 | B2 | 9/2015 | Urmanov et al. |
| 9,514,213 | B2 | 12/2016 | Wood et al. |
| 10,163,034 | B2 | 12/2018 | Urmanov et al. |
| 10,749,883 | B1 * | 8/2020 | Martin .................. G06F 21/554 |
| 10,956,779 | B2 | 3/2021 | Urmanov et al. |
| 10,992,675 | B2 | 4/2021 | Urmanov et al. |

(Continued)

OTHER PUBLICATIONS

Peter N. Yianilos; Data Structures and Algorithms for Nearest Neighbor Search in General Metric Spaces (Chapter 34); pp. 311-321; Jan. 1993; Downloaded from https://dl.acm.org/doi/10. 5555/313559.313789.
Raimundo Real et al; The Probabilistic Basis of Jaccard's Index of Similarity; Syst. Biol. 45(3): pp. 380-385, 1996.
Qiyuan Pang et al.; A Distributed Block Chebyshev-Davidson Algorithm for Parallel Spectral Clustering; Dec. 8, 2022, pp. 1-19.

(Continued)

*Primary Examiner* — David R Lazaro

(74) *Attorney, Agent, or Firm* — Kraguljac Law Group LLC

(57)　　　　ABSTRACT

Systems, methods, and other embodiments associated with quasi-supervised clustering for activity pattern characterization and anomalous activity detection are described. In one embodiment, a method generates a first sparse similarity matrix for nearest neighbors of a plurality of data points. The data points each characterize a pattern of activity associated with an account. The method generates a second sparse similarity matrix for random neighbors of the plurality of data points. The method recursively clusters the plurality of data points based on the first sparse similarity matrix. The method quasi-supervises the recursive clustering based on the second sparse similarity matrix to stop the iterative clustering when the data points are split into N clusters. The value of N is not pre-determined. The method detects that the individual data point has changed clusters, indicating anomalous activity. And, the method generates an electronic alert that the anomalous activity is associated with the account.

20 Claims, 6 Drawing Sheets

(56) References Cited

U.S. PATENT DOCUMENTS

| | | | | |
|---|---|---|---|---|
| 11,178,161 | B2 * | 11/2021 | Urmanov | H04L 63/0815 |
| 12,034,764 | B1 * | 7/2024 | Roundy | H04L 63/1425 |
| 12,367,508 | B2 * | 7/2025 | Gershon | G06F 18/2433 |
| 12,438,790 | B1 * | 10/2025 | Silverstein | H04L 43/0817 |
| 2015/0294052 | A1 * | 10/2015 | Urmanov | G06F 17/18 |
| | | | | 703/2 |
| 2018/0109531 | A1 * | 4/2018 | Urmanov | H04L 63/0227 |
| 2020/0409339 | A1 * | 12/2020 | Arashanipalai | G06F 16/906 |
| 2021/0326421 | A1 * | 10/2021 | Khoury | G10L 17/08 |
| 2025/0005145 | A1 * | 1/2025 | Kulathumani | G06F 21/554 |
| 2025/0310226 | A1 * | 10/2025 | Silverstein | G06F 16/282 |

OTHER PUBLICATIONS

Emmanuel Abbe; Community Detection and Stochastic Block Models: Recent Developments; pp. 1-86; Journal of Machine Learning Research 18 (2018) Published Apr. 2018.
Wen-Yen Chen et al; Parallel Spectral Clustering in Distributed Systems; pp. 1-32; published Apr. 8, 2010.
Elchanan Mossel et al.; Stochastic Block Models and Reconstruction; pp. 1-26; Nov. 12, 2018.
Denis Valle et al.; Automatic Selection of the Number of Clusters Using Bayesian Clustering and Sparsity-Inducing Priors; Article from Ecological Applications; The Ecological Society of America; Received Dec. 10, 2020; pp. 1-19.
Ulrike von Luxburg et al.; A Tutorial on Spectral Clustering; Max Planck Institute for Biological Cybernetics; 2007; pp. 1-32.

* cited by examiner

200

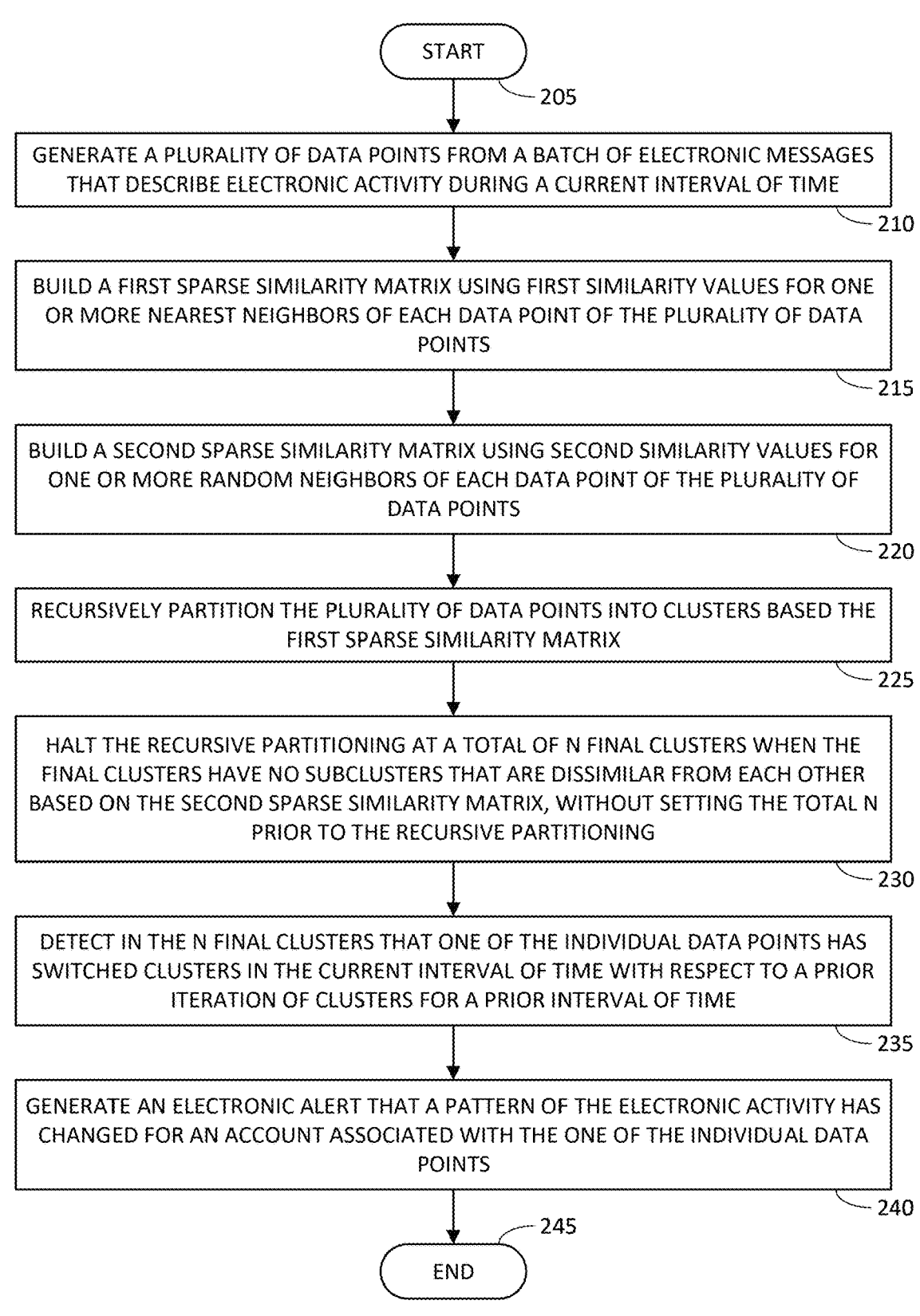

START

205

GENERATE A PLURALITY OF DATA POINTS FROM A BATCH OF ELECTRONIC MESSAGES THAT DESCRIBE ELECTRONIC ACTIVITY DURING A CURRENT INTERVAL OF TIME

210

BUILD A FIRST SPARSE SIMILARITY MATRIX USING FIRST SIMILARITY VALUES FOR ONE OR MORE NEAREST NEIGHBORS OF EACH DATA POINT OF THE PLURALITY OF DATA POINTS

215

BUILD A SECOND SPARSE SIMILARITY MATRIX USING SECOND SIMILARITY VALUES FOR ONE OR MORE RANDOM NEIGHBORS OF EACH DATA POINT OF THE PLURALITY OF DATA POINTS

220

RECURSIVELY PARTITION THE PLURALITY OF DATA POINTS INTO CLUSTERS BASED THE FIRST SPARSE SIMILARITY MATRIX

225

HALT THE RECURSIVE PARTITIONING AT A TOTAL OF N FINAL CLUSTERS WHEN THE FINAL CLUSTERS HAVE NO SUBCLUSTERS THAT ARE DISSIMILAR FROM EACH OTHER BASED ON THE SECOND SPARSE SIMILARITY MATRIX, WITHOUT SETTING THE TOTAL N PRIOR TO THE RECURSIVE PARTITIONING

230

DETECT IN THE N FINAL CLUSTERS THAT ONE OF THE INDIVIDUAL DATA POINTS HAS SWITCHED CLUSTERS IN THE CURRENT INTERVAL OF TIME WITH RESPECT TO A PRIOR ITERATION OF CLUSTERS FOR A PRIOR INTERVAL OF TIME

235

GENERATE AN ELECTRONIC ALERT THAT A PATTERN OF THE ELECTRONIC ACTIVITY HAS CHANGED FOR AN ACCOUNT ASSOCIATED WITH THE ONE OF THE INDIVIDUAL DATA POINTS

240

245

END

FIG. 2

ASSURANCE OF USER BEHAVIORAL PATTERNS IN SOFTWARE APPLICATIONS WITH QUASI-SUPERVISED CLUSTERING

BACKGROUND

User and Entity Behavioral Analytics (UEBA) is often implemented in modern cybersecurity defenses. The efficacy of UEBA heavily depends on accurate and detailed profiling of online activity of authenticated and anonymous users and other entities. In general, it is not possible to determine in advance of an analysis of behavior in cloud or other systems how many distinct patterns of activity occur within the system. Clustering analyses that might be used to group activity by pattern generally require pre-specification of the number of clusters corresponding to the distinct patterns. This prevents use of clustering to accurately profile the online activity.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 2 illustrates one embodiment of a UBPAS method that is associated with quasi-supervised clustering of user activity profiles for detection of threats to a cloud system.

DETAILED DESCRIPTION

Figure 1:
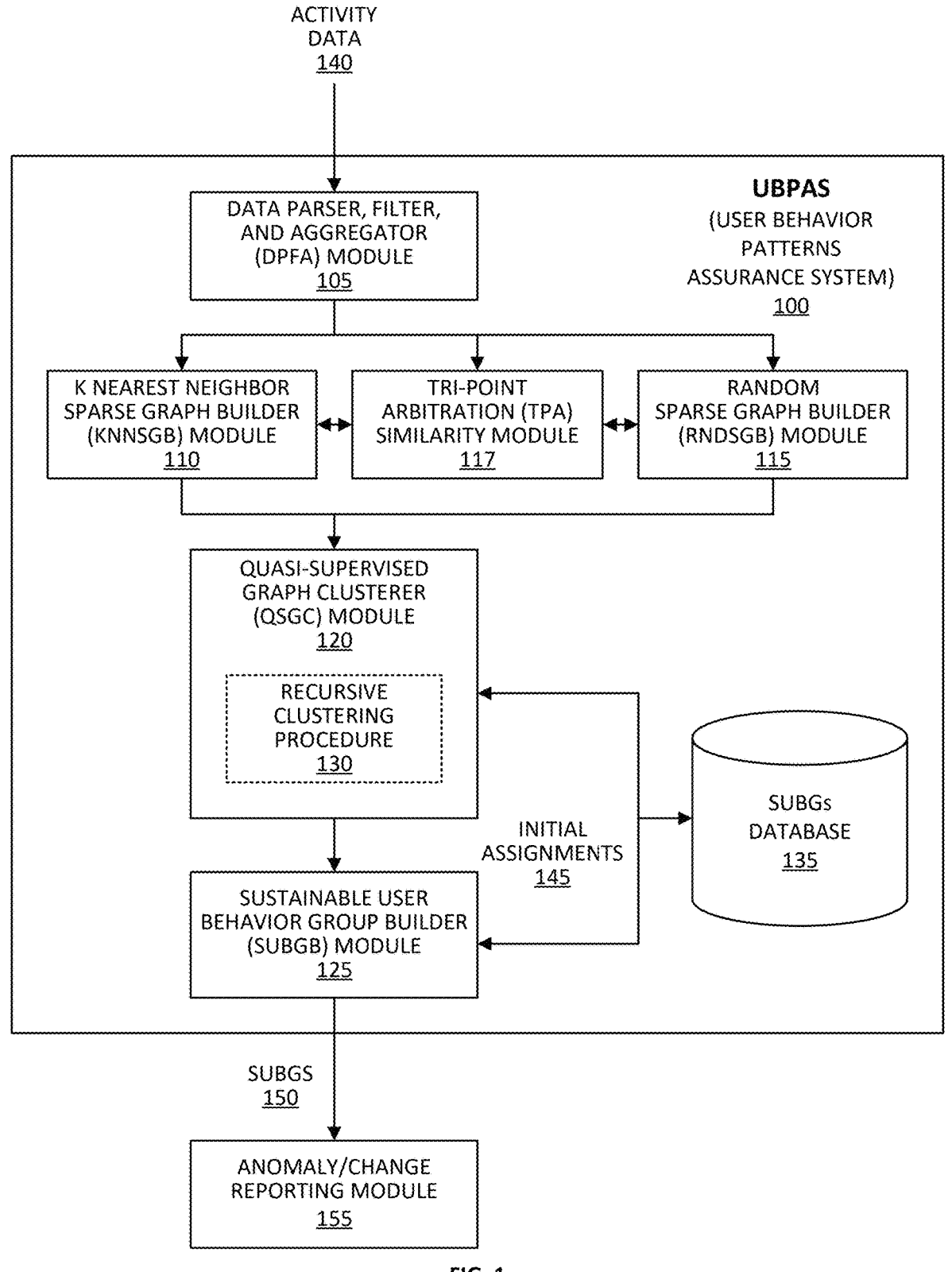
FIG. 1 illustrates one embodiment of a user behavior pattern assurance system (UBPAS) that is associated with quasi-supervised clustering of user activity profiles for detection of threats to a cloud system.

Systems, methods, and other embodiments are described herein that provide assurance of user behavior patterns in software applications using quasi-supervised clustering. In one embodiment, a user behavior pattern assurance system (UBPAS) system performs quasi-supervised clustering of user activity profiles (UAPs) for assurance of user behavioral patterns for User and Entity Behavioral Analytics (UEBA) elements of cyber defense solutions. In one embodiment, the UBPAS automatically determines the clusters UAPs that are actually distinct from each other in the UAP dataset based on a pair of sparse similarity matrix representations of the UAP dataset. The first sparse similarity matrix describes similarity with nearest neighbors for use in an iterative cluster partitioning analysis. And, the second sparse similarity matrix describes similarity with respect to overall structure or form of the UAP dataset for use in a supervisory determination of when to terminate the cluster partitioning. Certain changes in the resulting cluster assignments for a UAP profile over time (i.e., when clustering subsequent batches of user activity) can indicate anomalous, potentially malicious, behavior by the user.

In one embodiment, the quasi-supervised graph clustering techniques described herein improve over previous techniques because they enable the clustering process to automatically determine the number of distinct clusters automatically, even where the dataset represents inter-node similarity only sparsely. Clustering processes that automatically determine the number of distinct clusters automatically for a dataset that has a dense (i.e., complete) representation of inter-node similarity have been developed. But, the dense representation has a similarity matrix of N×N entries, which causes the dense similarity matrix to be impossibly large to use to cluster datasets of sizes commonly encountered in practice (such as in clustering of user behavioral patterns). A sparse similarity matrix reduces the compute resources required for clustering, but the clustering processes that automatically determine the distinct clusters using a dense similarity matrix may be inapplicable to sparse representations, and may produce inaccurate clusters.

In one embodiment, a novel quasi-supervised clustering system and method presented herein overcomes these and other challenges for clustering engines used in UEBA. As used herein, the term "quasi-supervised" is used to denote adaptation of an essentially unsupervised spectral clustering algorithm to introduce an aspect of supervision that determines when to halt the clustering from the data itself, as described herein. In one embodiment, quasi-supervised clustering evaluates validity of forming clusters as they are formed based on tri-point arbitration (TPA) similarity with random neighbors across candidate cluster splits into subclusters. The TPA similarity across candidate cluster splits is employed as a stopping criterion for recursive splitting of larger clusters into smaller clusters, starting with an initial cluster that includes all data points. By application of TPA similarity across candidate cluster splits as stopping criterion, quasi-supervised clustering mimics a supervised approach by dynamically inferring an optimal number of clusters for a given dataset from the dataset itself. The quasi-supervision removes any dependence on operator input to supply the number of clusters. Quasi-supervised clustering may thus provide groupings of user behavior suitable for integration into automated UEBA tooling pipelines. The groupings may be labeled based on activity patterns shared by or common to group members with labels that are persistently associated with the activity patterns.

In one embodiment, the quasi-supervised clustering is performed by the UBPAS system to substantially boost the efficacy of UEBA-based solutions relying on unsupervised clustering of user behavior. As an example, the UBPAS system provides assurance of user behavioral patterns in software applications based on quasi-supervised clustering of input attributes of user activities as an integral part of active UEBA-empowered cyber defense solutions. For example, the UBPAS system initially aggregates activity data for individual users from an application source(s). The UBPAS system then transforms aggregated activity attributes into user activity profiles (UAPs), which are collected into an input dataset. The UBPAS system executes the quasi-supervised clustering clusters on the input dataset to reveal sustainable (i.e., persistent) user behavioral groups (SUBGs). In one embodiment, the system then uses the sustainable user behavioral groups to enable assurance of user behavioral patterns through tracking membership of users in the groups. For example, where user behavior patterns cause membership of an individual user to deviate anomalously across groups, the individual user is behaving suspiciously, and the activities of the user may be automatically suspended or halted.

Example User Behavior Pattern Assurance System

FIG. 1 illustrates one embodiment of a user behavior pattern assurance (UBPAS) system 100 that is associated with quasi-supervised clustering of user activity profiles for detection of threats to a cloud system. UBPAS system 100 includes components configured for detecting anomalous, potentially malicious user activity based automated clustering of electronic user activity profiles (UAPs) into behavioral groups. The number of behavioral groups (i.e., clusters) is initially unspecified, but automatically derivable from the UAP dataset by UBPAS system 100. UBPAS system 100 is particularly adapted to handling a large UAP dataset by an ability to determine the behavioral groups using only sparse matrix representations of UAP similarities, thereby enabling large scale monitoring of user activity threats to the cloud system.

In one embodiment, the components of UBPAS system 100 include data parser, filter, and aggregator (DPFA) module 105, K nearest neighbor (KNN) sparse graph builder (KNNSGB) module 110, random sparse graph builder (RNDSGB) module 115, tri-point arbitration (TPA) similarity module 117, quasi-supervised graph clusterer (QSGC) module 120, and sustainable user behavior group builder module 125. QSCG module 120 implements a recursive clustering procedure 130. QSCG module 120 and SUBGB module 125 may access a sustainable user behavior group (SUBG) database 135.

In one embodiment, DPFA module 105 is configured to generate a plurality of data points from a batch of electronic user activity data 140. Activity data 140 includes electronic messages that describe electronic activity in a cloud network environment. The batch of the activity data 140 covers a current interval of time. The individual data points of the plurality characterize patterns of electronic activity that are associated with respective individual accounts. In one embodiment, DPFA module 105 is configured to parse activity data 140 to extract information relevant to characterization of the electronic activity. In one embodiment, DPFA module 105 is configured to filter activity data 140 to exclude information irrelevant to characterization of the electronic activity. And, in one embodiment, DPFA module 105 is configured to aggregate activity data 140 by account to generate UAPs for the accounts. Additional detail regarding DPFA module 105 is described below, for example under the heading "UBPAS—Example Data Parser, Filter, and Aggregator Module".

In one embodiment, KNNSGB module 110 is configured to build a KNN sparse similarity matrix (KNNSSM) using similarity values for one or more nearest neighbors of each UAP data point of the plurality of data points. In one embodiment, RNDSGB module 115 is configured to build a random sparse similarity matrix (RNDSSM) using similarity values for one or more random neighbors of each UAP data point of the plurality of data points. Because both the KNNSSM and RNDSSM are sparse representations of similarity in the UAP dataset, the proportion of the of the number of nearest neighbors K associated with UAPs in the KNNSSM and the proportion of the number of random neighbors L associated with UAPs in the RNDSSM is low in both instances. For example, K and L are typically both less than 20, while the size of the UAP dataset may be well in excess of tens of thousands of data points. Additional detail regarding KNNSGB module 110 and RNDSGB module 115 is described below, for example under the headings "UBPAS—Example KNN Sparse Graph Builder Module" and "UBPAS—Example Random Sparse Graph Builder Module", respectively.

In one embodiment, both KNNSGB module 110 and RNDSGB module 115 are configured to obtain similarity values between data points from tri-point arbitration (TPA) similarity module 117. TPA similarity module 117 is configured to accept one or more pairs of UAP data points to determine their similarity with reference to one or more arbiter points that are representative of the UAP dataset. For example, TPA similarity module 117 may be configured to accept a UAP data point and one of its neighbors for measurement of similarity with reference to the one or more arbiter points. TPA similarity module 117 is configured to select the one or more arbiter points to be representative of the UAP dataset, for example by sampling the arbiter points from the UAP dataset. TPA similarity module 117 is configured to determine the similarity of the pair of UAP data points based, at least in part, on distances between the arbiter point(s) and the two UAP data points. Additional detail regarding TPA similarity module 117 is described below, for example under the heading "UBPAS—Tri-Point Arbitration Similarity Metric".

In one embodiment, QSGC module 120 is configured to recursively partition or cluster the plurality of data points into clusters based on the KNNSSM first sparse similarity matrix. And, QSGC module 120 is configured to quasi-supervise the recursive clustering based on the similarity values of the random neighbors in the RNDSSM second sparse similarity matrix in order to the halt the recursive partitioning at a total of N clusters when the clusters have no subclusters that are dissimilar from each other. The value of N is not set prior to the recursive partitioning. In one embodiment, QSGC module 120 is configured to group the UAP dataset into N clusters of UAP data points that are internally homogenous or similar within their assigned cluster, and mutually distinct or dissimilar with respect to UAP data points in the other clusters.

In one embodiment, QSGC module 120 is configured to execute a recursive clustering procedure 130 to cluster the UAP dataset. In one embodiment, recursive clustering procedure 130 is a spectral clustering algorithm. Recursive clustering procedure 130 is configured to split a cluster of UAP data points into subclusters based on the KNNSSM first sparse similarity matrix. In particular, recursive clustering procedure 130 is configured to cut the cluster apart by severing connections between least similar UAP data based on one or more Eigenvectors that are associated with the smallest, non-zero Eigenvalues of a graph Laplacian of the KNNSSM. Recursive clustering procedure 130 is further configured to check whether or not the resulting subclusters are more dissimilar than similar based on the RNDSSM as a condition for continued recursion. In particular, recursive clustering procedure 130 is configured to determine whether a value of cross-cluster similarity between the subclusters is positive, indicating similarity of the subclusters and therefore satisfaction of a stopping condition, or negative, indicating dissimilarity of the subclusters and therefore satisfaction of a continuation condition. Recursive clustering procedure 130 is configured to determine cross-cluster similarity of subclusters by summing TPA similarities with the random neighbors in the RNDSSM for a set of pairings of UAP data points in respective subclusters. Recursive clustering procedure 130 is thus configured to stop splitting at a total of N mutually dissimilar clusters once no further mutually dissimilar clusters can be generated. Additional detail regarding QSGC module 120 and recursive clustering procedure 130 is described below, for example with reference to blocks 225-230 of method 200 and under the heading "UBPAS-Quasi-Supervised Graph Clusterer Module".

In one embodiment, SUBG database 135 is configured to store and serve initial assignments 145 to SUBGs during recursive clustering procedure 130, as well as final assignments to sustainable user behavior groups (SUBGs) 150.

In one embodiment, SUBGB module 125 is configured to establish and maintain a cluster identity for a cluster associated with a particular activity pattern over time. In other words, SUBGB module 125 is configured to label clusters associated with the particular activity pattern that occur in UAP datasets for distinct time intervals with a consistent cluster identifier. The cluster identities for the particular activity pattern designate sustainable (i.e., persistent) user behavioral groups (SUBGs) associated with the particular activity pattern.

In one embodiment, SUBGB module 125 is further configured to determine whether one or more changes of SUBG by a user over the course of multiple batches matches a pattern of activity that is suspicious, malicious, or otherwise anomalous. And, SUBGB module 125 may also be configured to determine whether a user has simply changed SUBGs, albeit in a way that does not match an anomalous pattern. SUBGB module 125 is therefore configured to evaluate the N clusters to detect that the individual data point has changed clusters in a manner indicative of anomalous activity, or more particularly, indicative of an anomalous change in the pattern of activity associated with the individual UAP data point. For example, SUBGB module 125 is configured to detect in the N final clusters that one of the individual data points has switched clusters in the current interval of time with respect to a prior iteration of clusters for a prior interval of time. Additional detail regarding SUBGB module 125 is described below, for example with reference to block 235 of method 200, under the heading "UBPAS-Sustainable User Behavioral Group Builder Module", with reference to cluster number synchronizer 470 of data flow 400, and chart of example UAP assignments to SUBGs 500.

In one embodiment, anomaly/change reporting module 155 is configured to generate an electronic alert that a pattern of the electronic activity has changed for an account associated with the one of the individual data points. For example, anomaly/change reporting module 155 may be configured to compose and transmit an electronic alert that a pattern of activity of a user has changed anomalously. Or, anomaly/change reporting module 155 may be configured to otherwise indicate that anomalous activity is associated with an account of a particular user. Additional detail regarding anomaly/change reporting module 155 is described below with reference to FIG. 3.

Further details regarding UBPAS 100 are presented herein. In one embodiment, the operation of UBPAS 100 to detect changes in activity patterns based on quasi-supervised clustering will be described with reference to UBPAS method 200 and FIG. 2. In one embodiment, an example integration of UBPAS 100 into cybersecurity defenses is described with reference to UEBA system 300 and FIG. 3.

In one embodiment, the flow of information among components of UBPAS 100 is described with reference to data flow 400 and FIG. 4. In one embodiment, an example of detection of anomalous (potentially malicious) activity based on clustering of UAPs into SUBGs by UBPAS 100 is described with reference to charted UAP assignments to SUBGs 500 and FIG. 5.

Example User Behavior Pattern Assurance Method

FIG. 2 illustrates one embodiment of a user behavior pattern assurance (UBPAS) method 200 that is associated with quasi-supervised clustering of user activity profiles for detection of threats to a cloud system. In one embodiment, UBPAS method 200 automatically determines an actual number of behavioral clusters that occur within the electronic communications (e.g., log messages or other activity data) of the cloud system during the process of assigning user accounts to the clusters. UBPAS method 200 determines the number of clusters based on similarity metrics for activity patterns of the accounts themselves, and without pre-specification of any number of clusters. Advantageously, UBPAS method 200 analyzes similarity for clustering based on sparse similarity matrix representations of the activity patterns of the individual user accounts, allowing analysis of far larger collections of electronic communications. UBPAS method 200 further tracks cluster assignments over time to detect anomalous changes in activity where an account is reassigned to a different cluster.

In one embodiment, UBPAS method 200 initiates at START block 205 in response to a UBPAS determining that (i) a time interval has elapsed for collecting electronic messages that describe user account activity, (ii) a batch of electronic messages hat describe user account activity has become available for processing, (iii) an instruction to perform the UBPAS method 200 has been received by the UBPAS; (iv) it is currently a time at which the UBPAS method 200 is scheduled to be run; or (v) UBPAS method 200 should commence in response to satisfaction of some other condition. In one embodiment, a computer system configured by computer-executable instructions to execute functions of UBPAS 100, UEBA system 300, and/or UBPAS 100 executes the UBPAS method 200. Following initiation at START block 205, UBPAS method 200 continues to block 210.

At block 210, UBPAS method 200 generates a plurality of data points from a batch of electronic messages. The batch of electronic messages describe electronic activity in a computer (e.g., cloud) system during a current interval of time. The batch of electronic messages may include, for instance, log messages or other activity data. In one embodiment, the electronic activity is electronic communication with the computer system that is associated with a user account that is transmitted to, from or within the cloud system. The individual data points of the plurality characterize patterns of user activity that are associated with respective individual accounts.

In one embodiment, UBPAS method 200 receives streams of the electronic messages from various sources of activity data. The electronic messages are enqueued or otherwise accumulated as a batch over the course of the interval of time. UBPAS method 200 parses the electronic messages to extract various attributes or features that characterize patterns of electronic activity (such as electronic communications, commands, etc.). For example, UBPAS method 200 parses the electronic messages by identifying and extracting key/value pairs or other information describing activity by the user account. UBPAS method 200 filters the messages to remove messages associated with the system, rather than user accounts. UBPAS method 200 sorts the messages into buckets associated with accounts based on an account or username attribute of the message. UBPAS method 200 then aggregates the messages into user activity patterns (UAPs or UAP records)—individual data points that characterize the actions taken in the cloud system by particular accounts during the interval of time. UBPAS method 200 may further encode the attributes or features recorded in the UAP records as integers. Block 210 then completes. In one embodiment, the operations of block 210 are performed by DPFA module 105 and/or DPFA module 105 (described in further detail below with reference to FIG. 4).

At block 215, UBPAS method 200 builds a first sparse similarity matrix. For example, the first sparse similarity matrix is a K nearest neighbors sparse similarity matrix (KNNSSM). UBPAS method 200 builds the KNNSSM at least in part by generating similarity values for one or more nearest neighbors of each data point of the plurality of data points. The nearest neighbors are a low proportion of the plurality of data points. As discussed above, an individual data point of the plurality of characterizes a pattern of electronic activity associated with a user account of the cloud system. UBPAS method 200 populates the KNNSSM with the generated similarity values.

In one embodiment, UBPAS method 200 builds the first sparse similarity matrix by first generating a Vantage Point (VP) tree from the UAP records. Then UBPAS method 200 identifies the K nearest neighbors of each UAP record by traversing the VP tree. UBPAS method 200 then determines similarities between each UAP record and its respective nearest neighbors by tri-point arbitration (TPA). UBPAS method 200 writes the TPA similarities for the nearest neighbors of the UAP records into the corresponding rows for the UAP records in the KNNSSM. Block 215 then completes. In one embodiment, the operations of block 215 are performed by KNNSGB module 110 and/or KNNSGB module 110 (described in further detail below with reference to FIG. 4).

At block 220, UBPAS method 200 builds a second sparse similarity matrix. For example, the second sparse similarity matrix is a random neighbor sparse similarity matrix (RNDSSM). UBPAS method 200 builds the RNDSSM by generating second similarity values for one or more random neighbors of each data point of the plurality of data points. The random neighbors are a second low proportion of the plurality of data points.

In one embodiment, UBPAS method 200 builds the second sparse similarity matrix by identifying a quantity L of random neighbors of each UAP record, for example by random sampling from the plurality of UAP data points. UBPAS method 200 then determines TPA similarities between each UAP record and its respective random neighbors. UBPAS method 200 writes the TPA similarities for the random neighbors of the UAP records into the corresponding rows for the UAP records in the RNDSSM. Block 220 then completes. In one embodiment, the operations of block 220 are performed by RNDSGB module 115 and/or RNDSGB module 115 (described in further detail below with reference to FIG. 4).

At block 225, UBPAS method 200 iteratively splits the plurality of data points into clusters. For example, UBPAS method 200 splits the plurality of data points into clusters recursively. The splitting is based on one or more of the similarity values of the nearest neighbors in the KNN sparse similarity matrix. UBPAS method 200 continues the iterative splitting until a stopping criterion is satisfied.

In one embodiment, UBPAS method 200 accesses the plurality of data points—the UAP dataset of UAP records—and loads it as an initial cluster. UBPAS method 200 then proceeds to iteratively partition, separate, cut apart, or otherwise split the initial cluster of data points into subclusters using a quasi-supervised graph clustering process. In one embodiment, UBPAS method 200 splits the clusters by spectral clustering, using a graph Laplacian of the KNNSSM and associated Eigenvectors (that correspond to smallest non-zero Eigenvectors of the graph Laplacian) to identify cuts that split the clusters into subclusters. In one embodiment, the splits are identified either based on the Fiedler vector or K-means clustering. The splitting process iterates recursively on each subclusters until a stopping condition (discussed below) is satisfied. In one embodiment, UBPAS method 200 stores intermediate and final cluster assignments, for example in SUBGs datastore 335. Block 225 then completes. In one embodiment, the operations of block 225 are performed by QSGC module 120 and/or QSGC module 120. Additional detail regarding quasi-supervised graph clustering is described below, for example under the heading "UBPAS-Quasi-Supervised Graph Clusterer Module".

At block 230, UBPAS method 200 stops the iterative (e.g., recursive) splitting when the data points are split into a total of N clusters. The stopping condition is based on one or more of the similarities of the random neighbors in the RNDSSM. In one embodiment, UBPAS method 200 quasi-supervises the iterative clustering based on the similarities of the random neighbors in the RNDSSM to determine when to discontinue or halt the splitting. The value of N is not set or determined prior to the iterative (e.g., recursive) splitting. UBPAS method 200 thus operates to halt the iterative (e.g., recursive) partitioning at the total of N clusters when the clusters have no subclusters that are dissimilar from each other based on the RNDSSM second sparse similarity matrix.

As block 225 proceeds through recursive splitting, UBPAS method 200 evaluates each split by computing the cross-cluster similarity between newly formed subclusters using the RNDSSM. In one embodiment, to evaluate a split, UBPAS calculates the cross cluster similarity by (i) determining all unique pairings of data points (UAP records) between two subclusters, (ii) retrieving the TPA similarity values for each pairing of data points from the RNDSSM (and not from the KNNSSM), (iii) sum (add) up all the retrieved TPA similarity values to produce the cross cluster similarity, (iv) determine the sign (positive or negative) of the cross-cluster similarity, (v) stop the recursive splitting and reject the subclusters where the cross-cluster similarity between the subclusters is positive, which indicates that the subclusters are similar and further subdivision would be redundant, OR, continue the recursive splitting where the cross-cluster similarity between the subclusters is negative, indicating dissimilarity between the clusters.

Note, in one embodiment, the recursive splitting and checking of the split subclusters against the stopping condition iterate for progressively smaller subclusters until no further subclusters that are mutually dissimilar with respect to the UAP dataset can be created. This maximum number N of mutually dissimilar clusters is developed empirically from the UAP dataset, and is not set prior to the recursive partitioning. Once the stopping condition for recursion—lack of further subclusters that are mutually dissimilar—is satisfied in all branches of recursion, the maximum number N of mutually dissimilar clusters is achieved and further partitioning is redundant. Block 230 then completes. In one embodiment, the operations of block 230 are performed by QSGC module 120 and/or QSGC module 120.

At block 235, UBPAS method 200 evaluates the N clusters to detect that the individual UAP data point has changed clusters in a manner indicative of anomalous electronic activity or of an anomalous change in the pattern of activity. For example, UBPAS method 200 detects in the N final clusters that one of the individual data points has switched clusters in the current interval of time with respect to a prior iteration of clusters for a prior interval of time. In one embodiment, UBPAS method 200 maintains a persistent association of cluster identifiers with particular pattern of activity across the prior and current intervals of time, such that a change in activity pattern by a user account results in a change of cluster identifier. In one embodiment, UBPAS method 200 obtains a prior assignment of a cluster identifier for the UAP data point for the prior interval of time, and compares the prior-assigned cluster identifier for the UAP data point to the currently assigned cluster identifier for the UAP data point. Where cluster IDs differ (and, in one embodiment, where other conditions are satisfied) the UAP data point is determined to represent anomalous activity. Thus, in one embodiment, UBPAS method 200 determines the UAP data point to represent anomalous activity based at least in part based on the switch or transition between clusters (SUBGs). Block 235 then completes. In one embodiment, the operations of block 235 are performed by SUBGB module 125 and/or SUBGB module 125.

At block 240, UBPAS method 200 generates an electronic alert that a pattern of the electronic activity has changed for an account associated with the one of the individual data points. For example, UBPAS method 200 generates an electronic alert that the pattern of activity has changed anomalously. UBPAS method 200 may thus generate an electronic alert that the anomalous activity is associated with the account. In one embodiment, the operations of block 240 are performed by anomaly/change reporting module 130 and/or anomaly/change reporting module 340.

In one embodiment, UBPAS method 200 repeats indefinitely in continual loop processing of subsequent batches of user activity data. Thus, at the completion of block 240, UBPAS method 200 may return to block 210 and repeat for a next batch. Or, UBPAS method 200 may complete and proceed to END block 245, where UBPAS method 200 concludes. In one embodiment, at the conclusion of UBPAS method 200, an electronic alert has been generated that a particular user account has performed anomalous, potentially malicious, activity during a given batch interval. Or, at the conclusion of UBPAS method 200, an electronic message may be generated that no accounts have performed anomalous activity during the given batch interval.

—Further Features of User Behavior Pattern Assurance Method—

In one embodiment, the quasi-supervision to stop the iterative clustering when the data points are split into the total of N clusters (as discussed in block 230) determines that a value of cross-cluster similarity between candidate clusters indicates that the candidate clusters are similar. In one embodiment, UBPAS method 200 continues recursively clustering while a value of cross-cluster similarity between candidate clusters indicates that the candidate clusters are dissimilar, and stops recursively clustering once the value of cross-cluster similarity between the candidate clusters indicates that the candidate clusters are similar. For example, stopping the recursive splitting when the data points are split into a total of N clusters further may include determining to stop the recursive splitting because a cross-cluster similarity between candidate clusters is greater than zero.

In one embodiment, halting the recursive partitioning at a total of N clusters includes steps for determining that subclusters (the candidate clusters) are similar. A set of cross-cluster pairs of data points is determined for the subclusters. Each pair of data points has a first data point in a first of the subclusters and a second data point in a second of the subclusters. The second similarity values (from the RNDSSM) that are associated with the cross-cluster pairs are aggregated into a cross-cluster similarity value. In one embodiment, the second similarity values are aggregated by cumulatively summing the values. In another embodiment, the second similarity values are aggregated by averaging the values. Then, the cross-cluster similarity value is detected to be positive or greater than zero, thereby indicating the subclusters to be similar, and that further partitioning is redundant.

In one embodiment, UBPAS method 200 further operates to maintain identity of clusters from a prior plurality or batch of data points. For example, UBPAS method 200 searches for prior clusters of the prior plurality of data points that correspond in pattern of activity to the N clusters (generated at block 230). Here, a given prior cluster corresponds to one of the N clusters where a cross-cluster similarity value generated by tri-point arbitration satisfies a threshold for similarity sufficient to establish identity with the prior cluster. UBPAS method 200 may then assign, to those of the N clusters for which one of the prior clusters correspond in pattern of activity, a cluster identifier that was assigned to the corresponding prior cluster. And, UBPAS method 200 may generate new cluster identifiers for those of the N clusters that do not have a corresponding prior cluster.

In one embodiment, UBPAS method 200 assigns to one of the N clusters an identifier of a prior cluster that is associated with a prior pattern of activity. The individual data point has changed clusters (as discussed at block 235) from the prior cluster to another of the N clusters that is associated with the current pattern of activity. As discussed above, the assignment is based on a value of tri-point arbitration similarity between the one of the N clusters and the prior cluster.

In one embodiment, as part of the determination that the change in clusters is indicative of anomalous activity (as discussed at block 235), UBPAS method 200 may determine that prior activity of the account was classified as deviant with respect to a prior cluster. Here the determination that the manner of the change is indicative of the anomalous activity is based at least in part on the deviance of the prior activity of the account. In one embodiment, to determine whether the prior activity was deviant, UBPAS method 200 determines whether or not the prior activity of the account was an outlier in a prior cluster. Thus, in one embodiment, UBPAS method 200 determines that prior activity of the account in the prior iteration of time was a (deviant) outlier in one prior cluster of the prior iteration of clusters; and determines that the switch in clusters by the individual data point was anomalous because the prior activity was an outlier.

In one embodiment, UBPAS generates the first similarity values and the second similarity values by tri-point arbitration. For example, the first similarity values and the second similarity values are tri-point arbitration similarity values in a range between negative one indicating complete dissimilarity, and positive one indicating complete similarity.

In one embodiment, as discussed below with reference to EQ. 1, UBPAS method 200 may generate individual similarity values of the first similarity values and the second similarity values by an algorithm for determining TPA similarity. For example, a first distance is determined between a data point of the plurality of data points and a neighbor of the data point. A second distance is determined between the data point and an arbiter point that is representative of the plurality of data points. The arbiter point is a point other than the data point and the neighbor. And, a third distance is determined between the neighbor and the arbiter point. From these distances, a subtractive difference is determined between (i) a least distance of the first distance and the second distance and (ii) the third distance. And, a maximum distance of the third distance and the least distance is also determined. The individual similarity value is then generated to be the ratio of the subtractive difference to the maximum distance.

In one embodiment, the first similarity values and the second similarity values are generated based at least in part on Jaccard distances. For example, the first distance, second distance, and third distance discussed above may each be Jaccard distances, as discussed below with reference to EQ. 2. Thus, UBPAS method 200 may generate the first similarity values and the second similarity values based on Jaccard distances between each of (i) a data point of the plurality of data points and a neighbor of the data point, (ii) the data point and an arbiter point that is representative of the plurality of data points, wherein the arbiter point is a point other than the data point and the neighbor, and (iii) the neighbor and the arbiter point.

—User and Entity Behavioral Analytics Context of UBPAS—

User and Entity Behavioral Analytics (UEBA) is a substantial element of modern cybersecurity defenses. UEBA monitors and evaluates the behavior of users and entities within a network with ML and AI analytics to detect insider threats, compromised accounts, and other potential security risks that other security tools might overlook. The efficacy of UEBA heavily depends on accurate and detailed profiling of online activity of users and other authenticated anonymous entities.

Existing UEBA approaches for profiling online activity of users utilize various supervised and unsupervised machine learning and artificial intelligence algorithms to learn "normal" patterns of user behavior, then detect deviation of observed behavior from the learned normal expected by the model. Both supervised and unsupervised approaches have drawbacks limiting the efficacy of UEBA solutions utilizing these approaches.

Supervised ML/AI approaches distinguish normal and abnormal user behavior using models that must be trained on datasets of normal and abnormal user behaviors that are labeled as such with trusted labels. This supervised approach finds little utility for UEBA because it is impracticable to obtain accurately labeled datasets of sufficient size to train the models to discriminate reliably. And, because unknown abnormal behaviors go unrecognized by the trained model, supervised methods are limited to the detection of known cyberthreats with documented patterns, and are not effective in protecting against unknown threats or threats without documented signatures.

Unsupervised methods find wider use in UEBA due to their power of modeling user behavior without needing labeled data. The unsupervised approaches are largely based on unsupervised clustering, but suffer substantially from a fundamental requirement to specify the number of clusters in advance. There is no reliable way of deciding in advance on the number of clusters of patterns of user activity. The number of clusters is specific to a particular application domain and data sources. And, due to dynamic nature of loads, user base, and service configurations, the number of clusters can change dramatically at different periods of time, and cannot be set to a fixed number in advance.

In one embodiment, the UBPAS 100 automatically determines and/or adjusts the number of clusters in real time to capture and distinguish normal and abnormal user behaviors in evolving datasets without reference to labeled training data. In one embodiment, the UBPAS improves the efficacy of UEBA in accurate and dependable user activity profiling for early detection of cyberthreats with unknown and/or non-threat-specific signatures. Thus, the UBPAS overcomes the mentioned shortcomings of the purely supervised and unsupervised ML/AI approaches.

Figure 3:
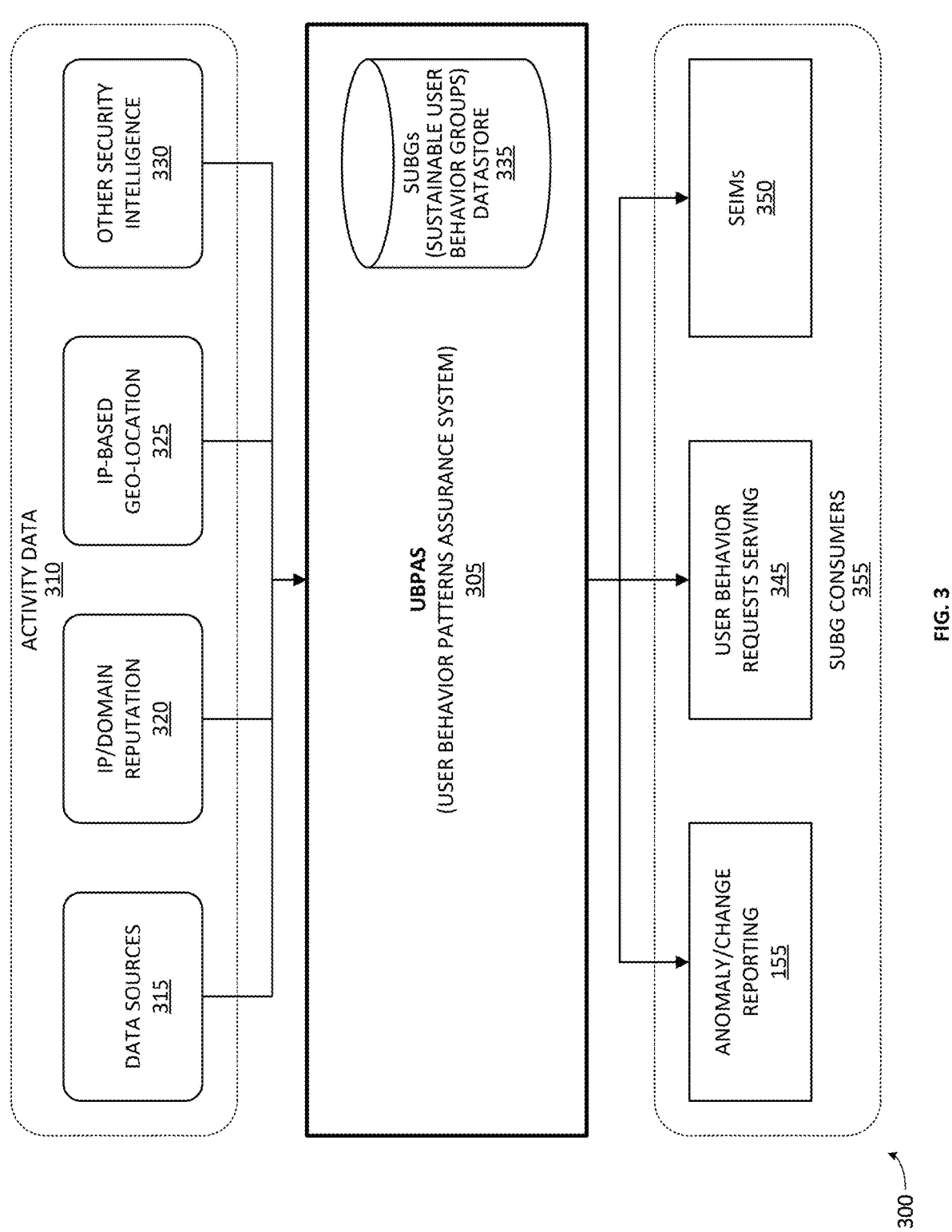
FIG. 3 illustrates one embodiment of a UEBA system that incorporates a UBPAS to provide improved user activity profiling using quasi-supervised clustering.

FIG. 3 illustrates one embodiment of a UEBA system 300 that incorporates a UBPAS 100 to provide improved user activity profiling using quasi-supervised clustering. UEBA system 300 accesses sources of user activity data 310, including data sources 315, IP/domain reputation 320, IP-based geo-location 325, and other security intelligence 330. UBPAS 100 is configured to identify sustainable user behavior groups (SUBGs) from input user activity data 310, store the SUBGs in a SUBGs datastore 335, and serve SUBGs to downstream components of the UEBA system 300. Downstream components of the UEBA system 300 include anomaly/change reporting 340, user behavior requests serving 345, and security information and event management (SEIM) 350.

In one embodiment, data sources 315 are configured to collect data about electronic communication activity by a user from various sources within a network environment. The data sources 315 may include a variety of sources within a network infrastructure. For example, data sources 315 may include logs or event records of (i) computing devices (such as servers and workstations), (ii) network devices (such as routers, switches, and firewalls), (iii) identity and access management systems, (iv) applications, (v) databases, (vi) domain controllers, or (vii) other systems.

In one embodiment, IP/domain reputation 320 is configured to evaluate a trustworthiness or risk level associated with a given internet protocol (IP) address or domain name based on previous behavior or historical activity. In one embodiment, IP/domain reputation 320 is configured to generate a reputation score for a given IP address or domain representing a history of malicious activity by the IP address or domain. The reputation score generated by IP/domain reputation 320 quantifies an extent to which an IP or domain has been involved in previous security incidents such as distributing malware, launching denial of service attacks, or engaging in phishing. The reputation score may also be based on whether the IP address or domain is known to be connected with other IP addresses or domains that have a history of malicious activity. In one embodiment, IP/domain reputation 320 is configured to evaluate the IP addresses associated with user activity recorded in data sources 315.

In one embodiment, IP-based geo-location 325 is configured to determine a geographic location associated with a given IP address. In one embodiment, IP-based geo-location 325 is configured to detect a country, region, city, postal code, latitude and longitude, or other physical location information of a device connected to the internet based on the IP address of the device. In one embodiment, IP-based geo-location 325 is configured to detect an Internet service provider (ISP) or an organization to which the IP address is registered. In one embodiment, IP-based geo-location 325 is configured to assign a geographic location to the IP addresses associated with user activity recorded in data sources 315.

In one embodiment, other security intelligence 330 is configured to collect data about user activity from security tools that are active in the network environment. The security tools may include antivirus software, intrusion detection systems (IDS), and intrusion prevention systems (IPS). For example, the antivirus software may provide user-specific (i) threat detection reports that log threats detected, files affected, and remediation actions taken by the antivirus software, (ii) system scan reports that show detections of viruses, worms, spyware, or other malware, (iii) risk summary reports that quantify risk level of a user based on threats detected in their systems, and (iv) behavior analytics that report on risky behavior such as downloading unsafe files or bypassing security controls. The IDS and IPS may provide user-specific (i) alerts, notifications, and logs about detected security incidents including user involved, nature of suspicious activity, and time of the incident, (ii) traffic analysis reports about network usage by a user for example such as unusual data transfers or connections to suspicious IP addresses, and (iii) reports of policy violations where actions of the user violate pre-defined security policies.

In one embodiment, UBPAS 100 is configured to generate SUBGs based on the activity data 310 supplied by one or more of the data sources 315, IP/Domain reputation 320, IP-based geo-location 325, and other security intelligence 330. In one embodiment, the activity data 310 may be provided in one or more live streams to UBPAS 310. In one embodiment, UBPAS 100 is configured to (i) accept the data from the incoming stream(s), (ii) transform the data into user activity pattern (UAP) records, (iii) represent the UAP records as both a KNN-sparse similarity matrix and a random sparse similarity matrix, (iv) recursively split the KNN-sparse similarity matrix into progressively more clusters until the cross-cluster similarities in the random sparse similarity matrix for all pairs of clusters are negative; and (v) build sustainable user behavioral groups (SUBGs)—that is, clusters with a persistent identity with regard to activities of the member users—based on the final clusters. Further detail describing the operation of UBPAS 100 is described elsewhere herein, for example with reference to FIG. 4 below.

In one embodiment, UBPAS 100 is configured to continually iterate the foregoing UBPAS analysis for batches of activity data 310 received in a live stream. Changes from batch to batch of activity data 310 of SUBG membership assigned to a user by the foregoing UBPAS analysis may indicate anomalous activity by the user.

In one embodiment, SUBGs datastore 335 is configured to store and serve SUBGs that are identified by UBPAS module 305. In one embodiment, SUBGs datastore 335 holds initial and/or interim cluster assignments during the recursive clustering procedure. And, in one embodiment, SUBGs datastore 335 holds final cluster assignments for one or more batches of activity data 310. The SUBGs may be accessed by or transmitted to a variety of SUBG consumers 355, such as anomaly/change reporting 340, user behavior requests serving 345, and SEIMs 350.

In one embodiment, anomaly/change reporting module 155 is configured to determine whether a user has changed SUBG anomalously over the course of multiple batches and report such anomalous changes. Anomaly/change reporting 340 is configured to transmit an electronic alert or other electronic message indicating that the user is behaving anomalously. And, in one embodiment, anomaly/change reporting 340 is configured to transmit an electronic alert or other electronic message indicating changes of SUBG that are not anomalous, for example changes that are conformant, or merely deviant.

In one embodiment, anomaly/change reporting module 155 is configured to generate the electronic alert by accessing a template message; inserting information indicating a particular account into the template message; inserting a status indicating activity in the particular account to be conformant, deviant, or anomalous into the template message; inserting an indication (such as a timestamp, batch number) of the interval or range of time associated with the message. Anomaly/change reporting module 155 is configured to then transmit the electronic message to one or more components configured to act on the message. The electronic message may be configured for presentation on a display, and, in response to receiving the message, the receiving component is configured to display the message.

In one embodiment, the electronic alert is a message that is configured to be transmitted over a network, such as a wired network, a cellular telephone network, wi-fi network, or other communications infrastructure. The electronic alert may be configured to be read by a computing device. The electronic alert may be configured as a request (such as a REST request) used to trigger initiation of an automated function in response to detection of anomalous behavior. For example, in response to receiving the electronic alert, access to the cloud network may be automatically terminated or otherwise restricted for the account exhibiting the anomalous behavior.

In one embodiment, user behavior requests serving module 345 is configured to respond to requests for information on user behavior. In one embodiment, user behavior requests serving module 345 is configured to report characteristic activities of o SUBG(s) to which the user was assigned. In one embodiment the requests may include at a specified time or range of time for the behaviors. In response to the request, user behavior requests serving 345 is configured to generate and transmit the report of the characteristic activities, for example in an electronic alert or other electronic message.

In one embodiment, SEIMs 350 are configured to correlate security events across multiple sources to detect and characterize threats to network security. In one embodiment, one or more SEIMs 350 are configured to detect and characterize threats to network security based at least in part on the SUBG(s). SEIMs 350 may also draw on other activity data 310. For example, appearance of a new SUBG with a small membership may be characterized as a part of a threat to network security. In one embodiment, one or more SEIMs 350 are configured to present interactive dashboards (graphical user interfaces) that display key security metrics and indicators. In one embodiment, one or more SEIMs 350 are configured to generate reports that document compliance of the networks with regulatory requirements, such as HIPAA (U.S. Health Insurance Portability and Accountability Act), GDPR (E.U. General Data Protection Regulation), or PCI-DSS (global Payment Card Industry Data Security Standard).

Example Implementation of UBPAS

Referring again to FIG. 1, FIG. 1 illustrates one embodiment of UBPAS 100. UBPAS 100 includes a variety of components or modules configured to generate SUBGs 150 based on an input stream of activity data 140 about actions taken by user accounts of a network environment. In one embodiment, UBPAS 100 comprises several interconnected modules, each performing a stage of the transformation from input activity data at a given data source into Sustainable quasi-labeled User Behavioral Groups (SUBG). UBPAS 100 includes a Data Parser, Filter, and Aggregator (DPFA) module 105 that is configured to generate records of user activity patterns (UAPs) with a uniform structure. UBPAS 100 includes two graph builders: a KNN Sparse Graph Builder (KNNSGB) module 110 that is configured to represent UAP records as a KNN sparse similarity matrix; and a Random Sparse Graph Builder (RNDSGB) module 115 that is configured to represent UAP records as a random sparse similarity matrix. UBPAS 100 includes a Quasi-Supervised Graph Clusterer (QSGC) module 120 that is configured to implement a recursive clustering procedure 130 to group the UAP records into clusters of users that behave similarly, or SUBGs. UBPAS 100 includes SUBGs database 135, which is configured to store and serve initial assignments 145 to SUBGs during recursive clustering procedure 130, as well as final assignments of SUBGs 150. And, UBPAS 100 includes a Sustainable User Behavioral Group Builder (SUBGB) module 125 that is configured to track SUBGs and user membership in the SUBGs over time.

In one embodiment, the interoperation of these modules (described in further detail below) provides the functionality for quasi-supervised clustering of user activity profiles for assuring user behavior patterns.

—UBPAS—Example Data Parser, Filter, and Aggregator Module—

In one embodiment, Data Parser, Filter, and Aggregator (DPFA) module 105 of UBPAS 100 is configured to access activity data 140 and generate records of user activity patterns (UAPs) that describe the electronic communication activity associated with accounts of individual users. Thus, DPFA module 105 is responsible for transforming data streamed by a given source that is possibly unstructured or structured in a way not suitable for representing UAPs of individuals into structured UAP records. In one embodiment, activity data 310 is streamed from one or more sources such as data sources 315, IP/Domain reputation 320, IP-based geo-location 325, and other security intelligence 330. DPFA module 105 is configured to collect from streams of activity data 310 information that describes the activities of users, such as log in times, file access patterns, and network activity. In one embodiment, activity data 310 is streamed as log messages (such as log messages 505) or other event records. DPFA may, for example, parse the log messages or event records from these sources to extract relevant data.

In one embodiment, DPFA module 105 is configured to generate UAP records to be in a particular data structure and/or to have a uniform data format. In one embodiment, the UAP records may be stored in SUBGs datastore 335 or another database. In one embodiment, UAP records are constructed as bags of values of categorical attributes observed over a certain period such as 1 day, 7 days, or 14 days. Note, a bag, also referred to as a multiset, is a data structure for a collection of items where multiple occurrences (duplicates) of a same element is allowed.

In one embodiment, a UAP record may include various statistics and histograms computed from observed attribute values, including those implicitly inferred from the observed attribute values using statistical/ML/AI models. In one embodiment, a UAP record may include learned repeated sequences of events or calls, along with statistical/ML/AI models describing the dynamics of observed event sequences.

In one embodiment, DPFA module 105 receives a stream of messages (or events or table rows) with various fields. Some fields may attribute a message to a known identity or a group of identities. And, some fields may have nullable values associated with various attributes whose interpretation is specific to the application or data source supplying the message. In one embodiment, the log messages represent actions taken by a user, that is, what the user has done in the cloud environment. In one embodiment, the log messages include codes or other attributes specific to a type or kind of command that was executed. In one embodiment, the messages may be formatted with some delimiter separated fields containing key/value pairs. For example, a message might contain the following key/value pairs: message_identifier/value; event_name/value; event_source/value; timestamp/value; username/value; source_ip_addr/value; resource_name/value; command_type/value; etc. Such information can be extracted as features from electronic communications, received over a network, attempting to access the user account of the online service.

In one embodiment, DPFA module collects messages for an interval of time, such as a day, hour, minute, or week as a batch of messages. In one embodiment, DPFA module 105 receives a stream of messages {M1,M2,M3, . . . . Mn} covering a period between a begin time T1 and an end time T2. DPFA module 105 then splits or allocates the received messages into bucket data structures {B1,B2, . . . . Bm} based on identity of user associated with the message. For example, each bucket may be associated with a unique identity (e.g. username). DPFA module 105 parses the message to extract the identity of the user associated with the message. For example, the identity can be explicitly read out from a designated key/value field. Or, for example, the identity can be inferred implicitly, either from other parsed key/value fields or with help from user identification and tracking tools (for example, $3^{rd}$ party user identification and tracking services external to UBPAS 100).

In one embodiment, DPFA module 105 filters the messages before allocating the messages to the buckets. For example, DPFA module 105 may filter the messages by diverting or preventing certain messages from entering the buckets according to pre-configured filter logic. Or, for example, a filter can specify a subset of specific event sources and networks for which user activity must be retained in the buckets. Additionally, the DPFA module may filter the messages by removing certain fields from messages and/or perform depersonalization of personally identifiable information (PII).

Then, DPFA module 105 aggregates filtered and redacted messages in each individual bucket into a UAP record. For m buckets {B1,B2, . . . . Bm}, DPFA module 105 generates m profiles: {UAP1, UAP2, . . . . UAPm}. In one embodiment, each UAP record contains a bag of distinct values for each attribute value with the count of how many times this attribute value was observed in the bucket. In one embodiment, where more than one attribute is to be retained for further analysis, the bag will also include the unique combinations (tuples) of attribute values observed in a single message, with the corresponding count. For example, a bag for a given user includes the cumulative attribute values collected during the interval of time, such as a bag of commands executed by John.Smith in a given day.

An example UAP record is shown in Table 1 below:

TABLE 1

```
Bucket[John.Smith] {
    source_ip_addr=10.0.0.1:10; 10.0.0.20:12; 10.0.0.15:1; ...
    resource_name= example.com:5; another.example.com:3
    source_ip_addr_resource_name=10.0.0.20_example.com:4; ...
}
```

In line two of the example UAP record, the UAP record shows with the listed source_ip_address that the network activity of John Smith originated from IP address 10.0.0.1 ten times, IP address 10.0.0.20 twelve times, IP address 10.0.0.15 one time, and so on. In line three of the example UAP record, the UAP record shows with the listed resource_name that the network activity of John Smith accessed example.com five times, and accessed another.example.com 3 times. In line 4 of the example UAP record, the UAP record shows with the listed source_ip_address_resource_name associations that the network activity of John Smith accessed example.com from IP address 10.0.0.20 four times, and so on.

In one embodiment, optionally, DPFA module 105 encodes values into integers. In particular, the attribute data in the UAP records is encoded as integers, converting attribute data from categorical values to a numerical form. A set of multiple UAP records may therefore be encoded into integers as a set of sets of integers. This may reduce downstream processing costs or otherwise ease implementation of downstream processing. In one embodiment, encoding UAP records as sets of integers enables use of a uniform distance measurement for multiple unencoded data types. In one embodiment, the attribute data is encoded by simply computing a hash code (H) of string representation of the attribute value, for example using a variation of the djb2 hash algorithm given in EQ. 0:

$$H = \sum_{i=0}^{n-1} s[i] \times 31^{(n-1-i)} \qquad \text{EQ. 0}$$

where s[i] is the character code value (such as ASCII value or Unicode value) of the i-th character of string s, and n is the length of string s. The exponent (n−1−i) decreases as the summation index i increases, which corresponds to the characters in the string from first to last. Although coefficients other than 31 may also be used, in one embodiment the coefficient 31 is used because it is a small prime number that helps to minimize collisions. In one embodiment, the attribute data is encoded by a label encoding process that assigns an integer value to each unique category value possible within the attribute space. The assignment relationship between category value and integer may be arbitrary, and need not necessarily reflect any inherent order. In one embodiment, the assignment is made in a dictionary or other data structure that supports a look up. In another embodiment, the attribute data is encoded by a hash encoding process. In the hash encoding process, a hash function encodes the attribute values into integers. The hash encoding process can reduce dimensionality over the label encoding process, but presents a risk of collisions where different attribute values are mapped to a same hash code.

An example set of several UAP records with values encoded as integers is shown in Table 2 below:

TABLE 2

```
John.Smith [[511552166, −1321751959, −1321751985],
    [ −1944013059, 1443301522]]
Allek.Dong [[...],[...]]
Anonymous [[...],[...]]
...
```

Lines 1-2 of Table 2 shows the UAP record for John Smith from Table 1 encoded as integers. Lines 3 and 4 shows other UAP records for Allek Dong and Anonymous, respectively.

DPFA module 105 then outputs a dataset in which activity data 310 has been parsed and allocated to particular users, filtered for content and relevance, and written into a uniform UAP record format. In one embodiment, DPFA module 105 outputs the dataset with UAP records represented as rows. In one embodiment, a UAP record is represented by bags of attribute values, and the dataset may be output with each row being a set of sets of attribute values. In one embodiment, a UAP record is represented by bags of integer encodings of attribute values, and the dataset may be output with each row being a set of sets of integers. In one embodiment, the dataset of UAP records is a batch of UAP records for activity data 310 between begin time T1 and end time T2. The dataset may be used to build similarity graphs. In one embodiment, DPFA module 105 outputs the dataset by writing it to memory or storage for example in a database associated with UBPAS 100.

—UBPAS—Example KNN Sparse Graph Builder Module—

In one embodiment, KNN Sparse Graph Builder (KNNSGB) module 110 of UBPAS 100 is configured to transform the dataset of UAP records provided by the DPFA module 105 into a similarity matrix or graph using a KNN-sparse representation. The resulting KNN sparse similarity matrix (KNNSSM) may then be analyzed with graph clustering tools to generate SUBGs.

As a practical matter, generating a fully-connected (or other dense) similarity matrix for the UAP dataset is not possible. Using fully-connected matrixes for clustering is intractable for datasets with as little as a few thousand vertices, due to the excessive memory and computational resources required. UBPAS 100 datasets typically have tens of thousands and millions of vertices. Further, naïve generation of a similarity matrix involves selection of a sigma parameter for a transform of distance values to similarity values, which influences the values to be clustered.

Accordingly, to handle UAP datasets of practical size, the similarity matrix of the UAP dataset should be sparse. The sparse similarity matrix of the UAP dataset retains a portion of matrix entries that is sufficient to perform accurate clustering of the original dataset, while reducing compute overhead (including memory space or processor time). One way to sparsify the similarity matrix of the UAP dataset is to use a KNN-sparse representation of the UAP dataset. In the KNN-sparse representation, for each row (that represents a UAP record), a fixed number of entries are retained that correspond to K nearest neighbors for the given row. The KNN sparse representation takes O(mK) space, which is a significant saving over O(m²) for the dense case.

In one embodiment, the KNNSGB module 110 employs Vantage Point trees ("VP trees") for performing the K nearest neighbor (KNN) search. Use of VP trees allows the KNN search to be realized in sublinear time. In a VP tree, one element (e.g., a UAP record) of the dataset is chosen as the "vantage point" for each node in the tree. The remaining elements are partitioned into two sets based on their distance to the vantage point. In one embodiment, the Jaccard index is used to compute the pair-wise distances between dataset rows as Jaccard distances, as discussed in greater detail below with reference to insider-based TPA similarity computations. In another embodiment, the distance is computed as a Euclidean distance or other suitable distance measure. The dataset is split into a set of elements that are closer to the vantage point (the closer subset) and another set of elements that that are farther away from the vantage point (the farther subset). This partitioning is recursively applied to each subset, thereby generating a tree where each node stores a vantage point and a threshold radius that defines the boundary between the closer and farther subsets.

To find nearest neighbors for a query point (e.g., a UAP record) based on the VP tree, the tree is traversed starting from the root. At each node encountered in the traversal of the tree, the distance is calculated from the query point to the vantage point of the node. The search is then continued in either the closer subset, the farther subset, or both, based on comparison of the calculated distance and the threshold radius of the node.

Where the distance is within the threshold radius, the closer subset (the subset of elements that are closer to the vantage point) is searched. And, if the total distance of a minimum distance to a candidate nearest neighbor found thus far plus the distance from query point to vantage point is greater than or equal to the threshold radius, the farther subset (the subset of elements that are farther from the vantage point) is also searched. Where this condition is true, the farther subset is searched in addition to the closer subset because it is possible under this condition that a nearer neighbor exists in the farther subset.

Where the distance is beyond the threshold radius, search the farther subset. And, if the total distance of the minimum distance to a candidate nearest neighbor found thus far minus the distance from query point to vantage point is less than or equal to the threshold radius, the closer subset is also searched. Where this condition is true, the closer subset is searched in addition to the farther subset because it is possible under this condition that a nearer neighbor exists in the closer subset.

Thus, in one embodiment, the KNNSGB module 110 builds a VP tree for the UAP dataset received from DPFA module 105. KNNSGB module 110 then uses the VP tree for the UAP dataset to build a KNN sparse similarity matrix (KNNSSM) that records the association of each UAP node with its nearest neighbors. For example, KNNSGB module 110 fills in the KNNSSM for the UAP dataset by (1) searching the VP tree to find K nearest neighbors for each UAP in the data set, and (2) writing the K nearest neighbors of the UAP in a row of the KNNSSM associated with the UAP. In one embodiment, the value of K is relatively small, for example K may be 20 or fewer nearest neighbors, or even 10 or fewer nearest neighbors.

In one embodiment, the KNNSSM includes a row for each UAP node. The row in the KNNSSM for the UAP record includes up to K pairs of a row index for a nearest neighbor and a value for similarity between the UAP record and the nearest neighbor. In one embodiment, the value for similarity between a UAP record and a nearest neighbor is a value of similarity determined using tri-point arbitration (as discussed in further detail below). In one embodiment, all K of the nearest neighbor entries for each UAP record are retained regardless of the actual distance values. In another embodiment, nearest neighbor entries above a chosen distance threshold can also be discarded, further reducing the required space. And, in another embodiment, all retained nearest neighbor entries can be set to a similarity value of 1.0, resulting in an unweighted graph representation of the UAP dataset.

In one embodiment, the KNNSGB module 110 outputs the KNNSSM representation of the UAP dataset. As an example, a KNN sparse similarity matrix (KNNSSM) for a UAP dataset of m UAP records (rows) with K nearest neighbors may be formatted as shown in Table 3 below:

TABLE 3

KNNSSM = [
  [rowidx__1__1:value;rowidx__1__2:value;...;rowidx__1__K:value],
  [rowidx__2__1:value;rowidx__2__2:value;...;rowidx__2__K:value],
  ...
  [rowidx__m__1:value;rowidx__m__2:value;...;rowidx__m__K:value]
]

where $rowidx_{ij}$ is the row index of the j-th nearest neighbor of the i-th row. Here, i runs from 1 to m and j from 1 to K.

Thus, in one embodiment, the KNNSSM is a matrix representation of a graph of the UAP dataset. Each row of the KNNSSM represents a UAP record (or node) in the UAP dataset. (As discussed above the UAP record is a bag of features for a user.) Each row represents up to K edge connections from the UAP record to other, nearest neighbor UAP records. Each edge connection indicates a similarity weight of the connection to the neighbor node.

In one embodiment, the KNNGB module 415 outputs the KNNSSM representation of the UAP dataset by writing it to memory or storage, for example in a database associated with UBPAS 100. The KNNSSM representation of the UAP dataset may then be fed into Quasi-Supervised Graph Clusterer (QSGC) module 425 for clustering and defining user behavioral groups.

—UBPAS—Example Random Sparse Graph Builder Module—

In one embodiment, Random Sparse Graph Builder (RNDSGB) module 115 of UBPAS 100 is configured to supply a random graph representation of the dataset of UAP records in addition to the KNNSSM representation of the UAP dataset. In other words, the UBPAS employs RNDSGB module 115 to transform the dataset of UAP records into a similarity matrix or graph using a random neighbor sparse representation. The resulting similarity matrix serves to provide a quasi-supervisory reference during clustering analysis of the KNNSSM representation of the UAP dataset.

Random Sparse Graph Builder (RNDSGB) module 420 provides functionality for enabling quasi-supervised clustering of the KNN-sparse similarity matrix. As mentioned above, there is no reliable way of deciding in advance on the number of desired clusters when clustering a KNNsparse similarity matrix. Further, existing cluster quality criteria may not provide adequate evaluation as the required information can be simply lacking in the KNN-sparse similarity matrix due to the way it is constructed.

The method of construction for the random sparse similarity matrix (RNDSSM) enables data-driven evaluation of the quality of clusters while performing recursive clustering. The RNDSSM fills a quasi-supervisory role in determining when to stop the cluster splitting procedure. Further splitting is discontinued when further splits result in worsening or violating a cluster quality criterion based on the random sparse similarity matrix. Additional detail on the use of the RNDSSM for clustering supervision is provided elsewhere herein, for example in the discussion of Quasi-Supervised Graph Clusterer (QSGC) module 425 below.

In one embodiment, the RNDSSM has a data structure similar to the KNNSSM, with row entries representing similarity of a UAP record with L neighbors. However, instead of populating the entries with nearest neighbors for each UAP record, the entries of the RNDSSM are populated using randomly selected neighbors. In one embodiment, the RNDSSM includes a row for each UAP record. In one embodiment, the rows for the UAP records in the RNDSSM uniquely correspond to rows for the UAP records in the KNNSSM in a one-to-one relationship. For example, the rows for the UAP records may be numbered or otherwise indexed alike in both the RNDSSM and the KNNSSM. In one embodiment, each row in the RNDSSM for the UAP record includes up to L pairs of a row index for a random neighbor and a value for similarity between the UAP record and the random neighbor. Just as with the values for similarity in the rows of the KNNSSM, the value for similarity between a UAP record and a random neighbor is determined using tri-point arbitration (as discussed in further detail below).

Optionally, in one embodiment, the UAP records of the RNDSSM are assigned a same number of neighbors L as the K neighbors included in the KNNSSM, although in other embodiments, L need not be equal to K. There may be use cases where Ls larger or smaller than K are appropriate. For example, the size of L may be driven by memory restrictions. And, for example, the size of L may depend on the structure of the specific UAP dataset. There is no general rule for how many neighbors K to keep in the KNNSSM, or for how many neighbors L to keep in the RNDSSM. In one embodiment, K and L are configurable parameters that may be pre-configured by administrators.

In one embodiment, the RNDSGB module 115 outputs the RNDSSM representation of the UAP dataset. As an example, a Random Sparse Similarity Matrix (RNDSSM) for a UAP dataset of m UAP records (rows) with L random neighbors may be formatted as shown in Table 4 below:

TABLE 4

RNDSSM = [
 [rowidx__1__1:similarity;rowidx__1__2: similarity;...;
  rowidx__1__L: similarity],
 [rowidx__2__1: similarity;rowidx__2__2: similarity; ...;
  rowidx__2__L: similarity],
 ...
 [rowidx__m__1: similarity;rowidx__m__2: similarity; ...;
  rowidx__m__L: similarity]
]

where $rowidx_{ij}$ is the row index of the j-th random neighbor of the i-th row. Again, i runs from 1 to m and j from 1 to L.

In one embodiment, the RNDSGB module 115 outputs the RNDSSM representation of the UAP dataset by writing it to memory or storage, for example in a database associated with UBPAS 100. The RNDSSM representation of the UAP dataset may then be fed into QSGC module 120 as a quasi-supervisory reference for determining a stopping condition for the clustering procedure.

The combined KNNSSM and RNDSSM representations take O(m×(K+L)) space, which remains significant saving over O(m²) for the dense case.

—UBPAS—Tri-Point Arbitration Similarity Metric—

In one embodiment, tri-point arbitration (TPA) similarity module 117 is configured to determine a similarity between UAP data points (or nodes) that accounts for the intrinsic structure of the UAP dataset using a technique referred to herein as tri-point arbitration (TPA). As mentioned above, the UBPAS generates values of similarity between nodes and nearest neighbors in the KNNSSM and RNDSSM using TPA. Similarity determined by TPA (also referred to herein as "TPA Similarity") provides an insider-based computation of similarity that, rather than determining similarity based on an external analyst, instead determines similarity with an internal arbiter that is representative of the UAP dataset itself. By introducing the internal arbiter, the UAP dataset itself—e.g., the collective UAP records—dictates what activities are similar or dissimilar to each other.

Thus, rather than expressing similarity by comparing distances between two data points in the UAP dataset to a range of similarity defined by the external analysis, TPA uses three points to determine similarity. TPA employs the two data points in the UAP dataset along with a third, internal arbiter point that represents the data set. Involving the arbiter point introduces representation of intrinsic structure of the UAP dataset into the similarity calculation. Therefore, when evaluating TPA similarity between two nodes (UAP records) of the UAP dataset, such as a UAP record and one of the neighbors of the UAP record, the UBPAS also selects an arbiter point ($a_1$) from a set of arbiter points A that is representative of the UAP dataset. The TPA similarity between the two nodes is then calculated based, at least in part, on a distance between the first and second data points and the selected arbiter point $a_1$.

A TPA similarity S for UAP records ($r_i$, $r_j$) with respect to arbiter point a is calculated as shown in EQ. 1 below, where p designates a two-point distance determined according to a given distance function:

$$S(r_i, r_j \mid a_1) = \frac{\min\{\rho(r_i, a_1), \rho(r_j, a_1)\} - \rho(r_i, r_j)}{\max\{\rho(r_i, r_j), \min\{\rho(r_i, a_1), \rho(r_j, a_1)\}\}} \qquad \text{EQ. 1}$$

Thus, in one embodiment, TPA similarity S is generated based on a first distance between the first and second UAP records $\rho(r_i, r_j)$, a second distance between the first UAP record and the arbiter point $\rho(r_i, a_1)$, and a third distance between second UAP record and the arbiter point $\rho(r_j, a_1)$.

In one embodiment, the distance function $\rho$ is a Jaccard distance $p_J$ between two data points (UAP records) x and y, given by EQ. 2 below, where X is a number (that is, a count or tally) of attributes present in data point x, where Y is a number of attributes present in data point y, and Z is the number of attributes present in both data points x and y:

$$\rho_J(x, y) = 1 - \left(\frac{Z}{X + Y - Z}\right) = 1 - \frac{|X \cap Y|}{|X \cup Y|} \qquad \text{EQ. 2}$$

The number Z may also be described as the size of the intersection of the sets of attributes of data points x and y, and the number X+Y−Z may also be described as the size of the union of the sets of attributes of data points x and y. (Note, Jaccard distance $\rho_J$ is the complement of the Jaccard index J.) In one embodiment, Jaccard distance $\rho_J$ is chosen from among potentially hundreds of alternative distance metrics for use in generating TPA similarity in the present large scale, sparse case at least because: (1) Jaccard distance is robust to variations in graph density because it focuses on shared connections relative to the total number of connections, allowing the TPA similarity based on Jaccard distance to remain an effective measure of similarity even in sparse graphs; (2) Jaccard distance is scale-invariant such that it is not affected by size of the connected neighborhoods of the data points being compared, thereby avoiding bias toward or against densely or sparsely connected nodes; and (3) Jaccard distance is computationally efficient, particularly for sparse graphs. In one embodiment, the distance function p is another distance function, such as Euclidean distance, Manhattan distance, or cosine distance.

The TPA similarity of EQ. 1 is a per-arbiter TPA similarity that is specific to an individual arbiter point $a_1$. Per-arbiter TPA similarity for a given UAP record pair $(r_i, r_j)$ may be aggregated over a set of arbiter points A that includes a plurality of arbiter points $(a_1-a_m)$. Aggregation over multiple arbiter points represents the intrinsic structure of the UAP dataset more fully and accurately in the similarity analysis. Thus, the UBPAS may calculate additional per-arbiter TPA similarities using the remaining respective arbiter points in the set of arbiter points A and combine the per-arbiter TPA similarities to produce a multi-arbiter TPA similarity. The aggregate, multi-arbiter TPA similarity for a given UAP record pair $(r_i, r_j)$ is calculated as shown by EQ. 3 below:

$$S(r_i, r_j \mid A) = \frac{1}{m} \sum_{k=1}^{m} S(r_i, r_j \mid a_k) \qquad \text{EQ. 3}$$

EQ. 3 aggregates per-arbiter TPA similarities by determining a mean of the per-arbiter TPA similarities. Other examples of aggregating the per-arbiter TPA similarities may also include determining: (i) a weighted mean of the per-arbiter TPA similarities based on a given criteria for relative importance of the respective arbiters; (ii) a median of the per-arbiter TPA similarities; (iii) a mode (value that occurs most frequently) for the per-arbiter TPA similarities; (iv) a geometric mean of the per-arbiter TPA similarities (that is, $m^{th}$ root of the product of the m per-arbiter TPA similarities); and so on.

As mentioned above, the arbiter points represent the UAP dataset that than an external analyst. The set of arbiter points A may be selected to represent an inherent structure—in particular, the probability distribution—of the UAP dataset. In one embodiment, the set of arbiter points A may be selected based on an empirical observation of the UAP dataset, for example by sampling the arbiter points from the UAP records in the UAP dataset. For example, a random sampling of the UAP records in the UAP dataset, or selection of all the UAP records in the UAP dataset will yield a set of arbiter points A with a probability distribution consistent with that of the UAP dataset. In one embodiment, arbiter points may be generated based on an actual or an estimated probability distribution of the UAP records in the UAP dataset.

Values for TPA similarity range from −1 to 1. TPA similarity is greater than zero when both distances from the arbiter to either UAP record are greater than the distance between the pair of UAP records. In this situation, the UAP records are closer to each other than to the arbiter. Therefore, a positive TPA similarity indicates that the UAP records are similar. The magnitude of the positive TPA similarity indicates an extent to which the UAP records are similar. A TPA similarity equal to positive one indicates a highest level of similarity, in which the UAP records are coincident with each other.

TPA similarity is less than zero when the distance between the arbiter and one of the UAP records is less than the distance between the between the pair of UAP records. In this situation, the arbiter is closer to one of the between the pair of UAP records than the between the pair of UAP records are to each other. Therefore, a negative TPA similarity indicates that the that the UAP records are dissimilar. The magnitude of the negative TPA similarity indicates an extent of dissimilarity between the UAP records. A TPA similarity equal to negative one indicates a complete dissimilarity between the UAP records (and, incidentally, that the arbiter coincides with one of the data points).

TPA similarity equal to zero results when the arbiter and UAP records are equidistant from one another. In this situation, there is complete neutrality with respect to the arbiter point. Therefore, a TPA similarity of zero indicates that the that the UAP records are neither similar nor dissimilar.

In one embodiment, UBPAS determines TPA similarity of a first UAP record and a second UAP record by: accessing the first UAP record and the second UAP record from a UAP dataset; choosing an arbiter point that is representative of a structure of the UAP dataset; determining a first Jaccard distance between the first UAP record and the arbiter point; determining a second Jaccard distance between the second UAP record and the arbiter point, and determining a third Jaccard distance between the first UAP record and the second UAP record; determining which of the first Jaccard distance and the second Jaccard distance is smaller; subtracting the third Jaccard distance from the determined smaller Jaccard distance, and setting the difference as a dividend; determining which of the third Jaccard distance and the determined smaller Jaccard distance is larger, and setting the determined larger Jaccard distance as a divisor and finding the quotient of the dividend and divisor as the TPA similarity. In one embodiment, UBPAS determines TPA similarity of a first UAP record and a second UAP record by repeating the foregoing process for a plurality of distinct arbiter points that are representative of the structure of the UAP dataset, and aggregating the per-arbiter TPA similarities. In one embodiment, TPA similarity module 117 of shown FIG. 1 above performs TPA similarity determinations between pairs of UAP records.

—UBPAS—Quasi-Supervised Graph Clusterer Module—

In one embodiment, quasi-supervised graph clusterer (QSGC) module 120 implements quasi-supervised graph clustering of the input KNNSSM using the corresponding RNDSSM for stopping criterion in the recursive spectral clustering procedure. In one embodiment, QSGC module 120 employs recursive spectral clustering to iteratively split the UAP dataset into optimally distinct clusters without needing a predefined number of clusters. In one embodiment, QSGC module 120 iteratively subdivides data clusters based on TPA similarity in the KNNSSM until no further meaningful separations are found to be possible based on cross-cluster TPA similarity in the RNDSSM.

Spectral clustering (also referred to as spectral partitioning) is one unsupervised approach for clustering graphs and dataset-based similarity matrices. Spectral clustering does not make distributional assumptions. Instead, spectral clustering relies only on the structure of unweighted or weighted graph for clustering. Spectral clustering has various variations allowing it to be applied to large scale graphs. One of the major challenges to the spectral clustering approach is the need for specifying an appropriate number of clusters in advance. Previous attempts to automate selection of the number of clusters do not provide meaningful clustering of similarity matrices, and are limited to certain assumed models of graphs—for instance, stochastic block models or their generalizations.

In one embodiment, QSGC module 120 implements a uniquely improved form of spectral clustering—quasi-supervised graph clustering—that allows the clustering procedure to automatically stop once it has arrived at a set of clusters for which no further subdivisions would be dissimilar, without pre-specifying any particular number of clusters. The resulting set of clusters may also be referred to as "optimal". Moreover, QSGC module 120 achieves the optimal clustering using sparse similarity representations of the dataset, without relying on a dense similarity representation of the dataset.

Note that, in one embodiment, quasi-supervised graph clustering as described herein may be generally applicable to clustering of large graph data sets. The quasi-supervised graph clustering operates to automatically detect an optimal number of clusters in the sparse regime where there is no access to a dense similarity matrix. Such clustering—with its automated stopping at a maximum of clusters that are actually dissimilar—enables a wide variety of downstream analyses. Therefore, in one embodiment, quasi-supervised graph clustering is especially applicable to large datasets for which similarity cannot be practically represented in the dense case, and in which an actual number of clusters is concealed in the data itself and not known in advance.

In one embodiment, QSGC module 120 executes a recursive clustering procedure 130. Initially, all UAP records (rows) in the UAP dataset are placed into a single initial cluster. At a high level, recursive clustering procedure 130 applies a spectral partitioner on the KNNSSM to split the cluster optimally: into two subclusters if the split is based on signs of a Fiedler vector (an Eigenvector that corresponds to the second smallest non-zero Eigenvalue) of a graph Laplacian GL, or into more than two subclusters if the split is based on k-means clustering using some number of the Eigenvectors corresponding to the smallest non-zero Eigenvalues of the graph Laplacian as feature vectors. The same clustering step is then applied to each resulting subcluster, splitting them into two or more clusters until a stop condition is reached for further splits.

Recursive clustering procedure 130 employs a spectral partitioner to split a given cluster into two or more subclusters. In one embodiment, the spectral partitioner finds a subset of a cluster with a minimum number of edges that can be cut to separate it from the remainder of the cluster. This may be referred to as the minimum cut. The spectral partitioner severs the edges of the minimum cut to separate the cluster into two (or more) subclusters. In one embodiment, where the split is into two subclusters, the split is based on signs of elements of the Fiedler vector of a graph Laplacian (GL) computed from the KNNSSM. In one embodiment, where the split is into more than two subclusters, the split is based on k-means clustering using a group of Eigenvectors corresponding to smallest non-zero Eigenvalues of the graph Laplacian (GL) computed from the KNNSSM.

In one embodiment, the GL is given by EQ. 4 below:

$$GL = D - KNNSSM \qquad \text{EQ. 4}$$

where D is the degree matrix—a diagonal matrix with diagonal elements equal to the sum of row values of the KNNSSM. In other words, where KNNSSM has m rows, the degree matrix D is a m×m matrix where each diagonal element $D_{ii}$ is the sum of the similarities in row i in the KNNSSM, and the off-diagonal elements are zero. The graph Laplacian GL describes the difference between the degree matrix and the KNNSSM. The graph Laplacian GL encodes the contextual relationships between neighboring UAP records (or more generally, data points) of a cluster. The diagonal entries $GL_{ii}$ include the cumulative similarity of UAP record i with its nearest neighbors, while the off-diagonal entries $GL_{ij}$ is the negative of the similarity value between UAP records i and j.

The recursive clustering procedure 130 then computes Eigenvalues and Eigenvectors of the graph Laplacian. In one embodiment, recursive clustering procedure 130 executes a block Chebyshev-Davidson method-based solver (BCDM solver) for finding Eigenvectors with smallest non-zero Eigenvalues of a graph Laplacian. The BCDM solver is optimized for handling sparse similarity matrices, and allows for initializing the solver with previous solutions. Use of a BCDM solver significantly speeds up the convergence when the method is repeatedly used for clustering evolving datasets.

Once the Eigenvalues and Eigenvectors have been determined, in one embodiment, the recursive clustering procedure 130 selects the Eigenvector corresponding to the smallest non-zero Eigenvalue (also known as the Fiedler vector) as a basis for partitioning the graph. The element values of the Fiedler vector guide the partitioning decision to minimize connectivity between clusters while maximizing connectivity within clusters. For example, the sign (i.e., positive or negative) of the elements determine the partition of the cluster. Where the elements of the Fiedler vector alternate in sign, recursive clustering procedure 130 makes a cut between UAP records with positive values and UAP records with negative values to partition the cluster into two subclusters.

Or, once the Eigenvalues and Eigenvectors have been determined, in one embodiment, the recursive clustering procedure 130 selects a subset of Eigenvectors corresponding to the smallest non-zero Eigenvalues. In one embodiment, the Eigenvectors selected are those corresponding to the Eigenvalues that precede a sharp change in rate of increase of the Eigenvalues in ascending order. Each UAP record of the cluster is represented as a vector in a low-dimensional Eigenspace spanned by these eigenvectors. Recursive clustering procedure 130 applies the k-means clustering algorithm to the vector representations of the UAP records in the low-dimensional eigenspace to obtain centroids. Recursive clustering procedure 130 assigns each UAP record to a subcluster associated with a centroid nearest to the vector representation of the UAP record in the low-dimensional Eigenspace. The recursive clustering procedure 130 makes cuts between the assigned subclusters of UAP records.

Regardless of splitting technique, in one embodiment recursive clustering procedure 130 evaluates each split of a cluster to determine whether the subclusters are truly dissimilar. After each split, recursive clustering procedure 130 evaluates the subclusters resulting from the split using a stopping criterion. The stopping criterion checks the validity and quality of the subclusters based on corresponding UAP records in the RNDSSM. Cross-cluster similarity may be computed using insider-based TPA similarity values ranging between −1.0 and 1.0 (discussed above), such that negative values for cross-cluster similarity represent dissimilar clusters and positive values for cross-cluster similarity represent similar clusters. This enables the stopping criterion to evaluate the validity and quality of clusters based on cross-cluster similarities computed on the RNDSSM, using cluster assignments generated by clustering of the KNNSSM.

At a high level, in one embodiment, the stop condition determines whether parts (subclusters) of the newly split cluster are similar or dissimilar. Where the subclusters are similar, splitting stops, because recursive clustering procedure 130 has determined that further splitting of existing clusters will produce clusters that are similar to each other. The point where further splitting of existing clusters will produce similar clusters is the stopping point, end, or base condition of recursive clustering procedure 130. In recursive clustering procedure 130, new clusters are valid when dissimilar from other clusters. New clusters that are similar to each other are therefore invalid.

In the KNNSSM, because it retains only TPA similarity values for a set of nearest neighbors, the TPA similarity values will generally be positive, indicating similarity (unless the set of neighbors is a high proportion—e.g., greater than 50%—of the available UAP records, in which case negative TPA similarity values may also be present). And, when TPA similarity values for nearest neighbors are used to compute cross-cluster similarity between subclusters, the TPA will be positive due to the fact that only positive values are retained for the nearest neighbors, and there are therefore no negative TPA similarity values in the KNNSSM. Accordingly, were the recursive clustering procedure to base cross-cluster similarity on the KNNSSM, splitting would continue until clusters have only one member because no matter how many times the clusters are split, cross-cluster similarity computed using the entries of the KNNSSM will always be positive.

To overcome the lack of a base condition in the KNNSSM, recursive clustering procedure 130 refers to the RNDSSM to provide quasi-supervisory feedback that instructs the clustering procedure to stop splitting. The neighbors of a UAP record in the RNDSSM are other UAP records selected at random. These random neighbors are not necessarily close. The TPA similarity values for the L random neighbors to the UAP record will therefore have entries that range from negative to positive. Cross cluster similarity based on the random neighbors will therefore be positive when the subclusters are similar, and negative where the subclusters are dissimilar, providing a clear indication of whether the split should be adopted or rejected.

The splitting process will continue until the end iteration, in which the subclusters are sufficiently similar that splitting is to be stopped. For example, where cross-cluster similarity between the subclusters in the RNDSSM is negative, splitting continues, because the subclusters resulting from the split of the cluster are dissimilar. And, where cross-cluster similarity between the subclusters in the RNDSSM is positive, splitting terminates, because the subclusters resulting from the split of the cluster are similar, and the cluster should not be split.

In one embodiment, the stopping criterion checks both the validity and the quality of subclusters before finalizing the subclusters as new clusters. In one embodiment, subclusters, which are generated based on the KNN matrix, are considered to be valid clusters if all cross-cluster similarities between all pairs of clusters are negative or zero in the RNDSSM matrix. In one embodiment, subclusters are invalid clusters if some or all cross-cluster similarities are positive.

In one embodiment, the stopping criterion computes the cross-cluster similarity as the sum of similarities in the RNDSSM for rows from the different subclusters, and invalidates or rejects the subclusters if the cross-cluster similarity is positive. Thus, in one embodiment, the stopping criterion includes a validity stopping criterion STOP_VALID, which is satisfied where all cross-cluster similarities for the subclusters are negative or zero, based on the cross-cluster similarity of the subclusters in the RNDSSM.

Given two or more subclusters $\{C_1, C_2, \ldots\}$, the cluster validity criterion (CVC) is given by EQ. 5 below:

$$CVC = CCSIM(C_i, C_j) < 0 \text{ for } \forall i, j \text{ and } i \neq j \qquad \text{EQ. 5}$$

The cross-cluster similarity (CCSIM) is given by EQ. 6 below:

$$CCSIM(C_i, C_j) = \sum RNDSSM_{uv}, \text{ for } \forall u \in C_i \text{ and } v \in C_j \qquad \text{EQ. 6}$$

In one embodiment, to establish cross-cluster similarity, recursive clustering procedure 130 sums similarity entries in the RNDSSM corresponding to pairs from different subclusters. In particular, all pairings of UAP records (u,v) in two subclusters are iterated through, and the similarity values of the respective random neighbors in the paired records are summed. This produces a cumulative sum of similarities of the random neighbors all the pairs of records. At the end of the summing, the sign (positive or negative) is determinative as to whether the subclusters are similar or not.

The cluster validity criterion CVC is true when all cross-cluster similarities CCSIM for all pairs of clusters are negative. If newly created subclusters are invalidated by the CVC, the recursive clustering procedure 130 is stopped, and the last valid set of clusters is returned as the result. In other words, when cross cluster similarity between subclusters transitions from negative to positive, no further splits should be made. The split that would result in cross-cluster similarity is discarded, and the unsplit cluster is retained as the final cluster. When cross-cluster similarity between all further subclusters becomes positive, no further clusters that are dissimilar can be obtained, an optimal number of clusters has been reached, and further subdivision should cease. In one embodiment, the subclusters are thus candidates to become clusters, subject to a quasi-supervisory analysis based on the RNDSSM.

In one embodiment, the stopping criterion can also use the sum of all cross-cluster similarities CCSIM as a cluster quality criterion STOP_QUALITY. Given two alternative valid clusterings, the one with a smaller sum of cross-cluster similarities is considered "better" and chosen preferentially over the other. Thus, cluster quality criterion STOP_QUALITY prefers clustering with smaller cross-cluster similarities, again based on the RNDSSM matrix's metric.

In one embodiment, at the conclusion of the quasi-supervised clustering, the UAP dataset has been split into a set of clusters that correspond with observable behavior groups of user activity. The set of clusters generated is a maximum number of clusters that are dissimilar, based on TPA similarity analysis. The resulting clusters are all mutually dissimilar, and correspond to behavior groups that are observably dissimilar from each other.

The QSGC module 120 outputs the set of clusters, each cluster representing a group of users that have similar activity profiles. The output provides user membership in user behavioral groups and aggregated group activity profiles. The set of clusters may be used as a tool for detection of anomalies by tracking changes in cluster membership by users, as discussed below.

—UBPAS—Sustainable User Behavioral Group Builder Module—

In one embodiment, sustainable user behavioral group builder (SUBGB) module 125 (1) assures or maintains membership of tracked users and identities in the behavioral groups, (2) generates alerts upon detected changes in membership and behavioral group count and composition, and (3) provides a backend for serving user behavior analytics queries from various SUBG consumers 335.

When tracking users over extended periods of time—for example, by processing batches of log messages for a given interval of time such as one day—each clustering operation on a batch produces clusters in an unspecified order, and without reference to identifiers assigned to prior clusters of particular user activities. SUBGB module 125 assigns unique identifiers to clusters as new clusters appear. SUBGB module 125 also tracks clusters across batches, maintaining the assignment of the unique identifier for a cluster of particular user activities to subsequent iterations of the cluster for the particular user activity. SUBGB module 125 thus assures user membership in behavioral groups that are sustained from batch to batch, and enables alerts on changes of membership in the behavioral groups.

In one embodiment, initially, SUBGB module 125 establishes and maintains a cluster identity for the cluster associated with each particular activity pattern. In one embodiment, SUBGB module 125 creates the cluster identity upon an initial appearance (in a prior batch of activity data) of a cluster of UAP data points that are associated with the particular activity pattern. SUBGB module 125 stores the identity in association with the activity pattern, for example in SUBG database 135. Thus, in one embodiment, SUBGB module 125 creates an assignment of cluster identity to activity pattern for each cluster of UAP data points that exhibit a distinct activity pattern. In one embodiment, the activity pattern is represented the user accounts that exhibit the activity pattern to which the cluster identity is assigned.

For a subsequent batch of activity data following the prior batch, SUBGB module 125 compares one or more new clusters generated for the subsequent batch with one or more old clusters generated for the prior batch. As used herein, "old" clusters are those clusters generated in a prior iteration of clustering for an earlier batch of activity data, while "new" clusters are those clusters generated in a current iteration of clustering for a current batch of activity data. Where a new cluster and an old cluster share a particular activity pattern (or are a match in terms of the particular activity pattern), SUBGB module 125 assigns the cluster identity of the old cluster associated with the particular activity pattern to the new cluster that is associated with the particular activity pattern. The cluster identity is thereby sustained for the particular activity pattern over multiple clustering batches. This persistent association of cluster identity with activity pattern is also referred to herein as a sustainable user behavior group (SUBG).

In one embodiment, SUBGB module 125 finds a match and assigns the cluster identity of an old cluster to a new cluster where the cross-cluster TPA similarity between the old and new clusters exceeds a threshold. For example, the threshold may be a TPA similarity value between the old and new clusters that exceeds 0.9, where the TPA similarity value between the clusters is measured between −1.0 and 1.0. Here, the cross-cluster TPA similarity value may be an average value of TPA similarity between cross-cluster pairs of nodes. In the cross-cluster pairs of nodes, one node of each pair is selected from the old cluster, and the other node of the pair is selected from the new cluster. The nodes assigned to the pairs may be selected at random from the new and old clusters. The TPA similarities between each of these pairs is averaged (or otherwise aggregated) to produce the cross-cluster similarity.

From the SUBGs, SUBGB module 125 may track assignments of UAP data points to clusters over time, from batch to batch. In one embodiment, SUBGB module 125 detects when the assignment of cluster ID to a UAP data point changes from one batch to another. In other words, SUBGB module 125 detects user transitions between SUBGs. For example, SUBGB module 125 accesses the list of UAPs in the N current clusters, for example from a list or other data structure allocating or assigning the cluster IDs of the N current clusters to the UAPs. Then, SUBGB module 125 obtains prior assignments of cluster IDs to the listed UAPs (to the extent the prior assignments exist). The prior assignments may be those cluster IDs most recently assigned to the UAPs prior to the current assignments. Then, SUBGB module 125 compares the cluster IDs currently assigned to the UAPs with the prior cluster ID assignments for the UAPs. Where the current and prior cluster IDs for a UAP do not match, the UAP has transitioned into the SUBG having the current cluster ID.

Further, in one embodiment SUBGB module 125 may analyze whether the SUBG transition (change in cluster assignment from one batch/time range to the next) is considered to be conformant, deviant, or anomalous based on various conditions. In one embodiment, SUBGB module 125 evaluates whether a UAP is an outlier within its currently assigned cluster. Example conditions for classification as conformant, deviant, or anomalous follow: (i) a UAP is considered conformant where it remains in a given SUBG (i.e., no change of assigned cluster ID) and is not an outlier within its currently assigned cluster; (ii) a UAP is considered deviant where it remains in a given SUBG and is an outlier within its currently assigned cluster; (iii) a UAP is considered anomalous where it was considered deviant in an immediately previous SUBG and has transitioned to another SUBG; (iv) a UAP is considered conformant where it has transitioned to another SUBG and was considered conformant in an immediately previous SUBG; (v) a UAP is considered conformant where it transitions, accompanied by one or more other UAPs, to a new SUBG created specifically for the activity pattern of the plurality of UAPs; and (vi) a UAP is considered anomalous where it transitions by itself into a new SUBG created specifically for the activity pattern of the UAP. Other conditions for classification of a UAP as conformant, deviant, or anomalous may also be applied. In this way, SUBGB module 125 may evaluate the N clusters to detect that where one or more individual UAP data points have changed clusters in a manner indicative of an anomalous change in the pattern of activity associated with the individual UAP data point.

SUBGB module 125 is further configured to serve the SUBGs (assignments of user behavior to clusters with persistent identities) to SUBG consumers 355. The persistent cluster identities of the SUBGs allow the SUBG consumers to maintain access to a data entity that is consistently associated with a given activity pattern. SUBGB module 125 is also configured to serve its classifications of UAPs as conformant, deviant, or anomalous. For example, anomaly/change reporting 155 is configured to access the classifications, and compose and transmit electronic alerts in response to UAPs that are classified as anomalous. And, for example, user behavior requests serving 345 is configured to search the UAPs for the UAP associated with a given user (or multiple users), and return the series of classifications and SUBGs assigned to the user.

Additional detail regarding the operation of SUBGB module 125 is described below with reference to cluster number synchronizer 470 of FIG. 4 and chart 500 of FIG. 5.

Example UBPAS Data Flow

Figure 4:
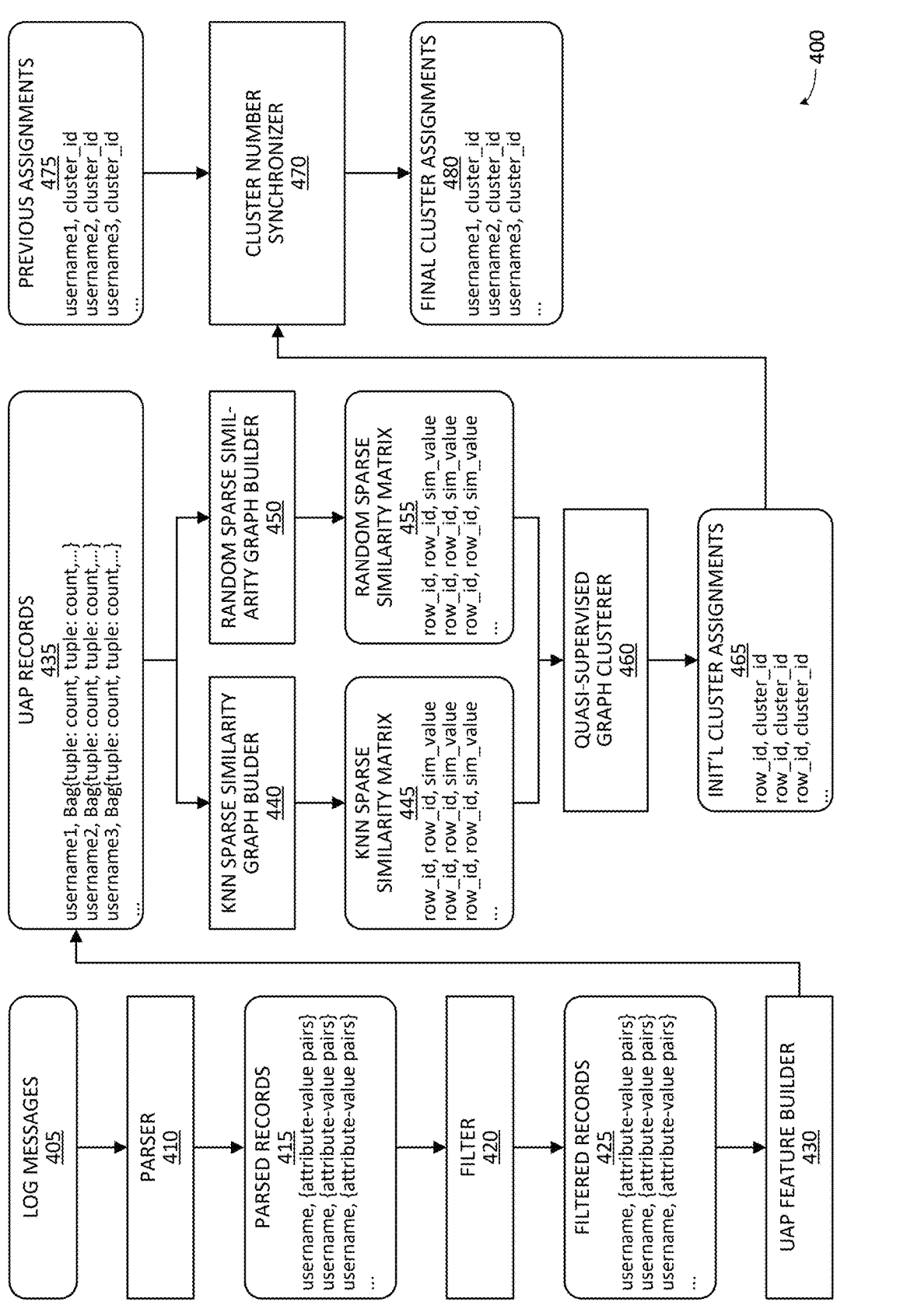
FIG. 4 illustrates an example data flow associated with quasi-supervised clustering of user behavior patterns.

FIG. 4 illustrates an example data flow 400 associated with quasi-supervised clustering of user behavior patterns. Data flow 400 shows a high-level overview of data inputs, data outputs, and processes in an example user behavior pattern assurance system (such as UBPAS 100).

Initially, in one embodiment, UBPAS 100 takes in log messages 405 (or other messages). The log messages 405 are records that describe various activity data (e.g., activity data 310) about actions taken by user accounts in a cloud environment. The log messages 405 are thus data structures. The log messages 405 may arrive in a continual stream(s) over the course of a time interval, such as a week, a day, an hour, or a minute. In one embodiment, log messages 405 have some attribute values. For example, the attribute values in a log message may include a user account associated with an action, an IP address from which the action was received, a resource accessed by the action, and one or more data describing the action taken. Log messages 405 may also include data such as login attempts, file accesses, or other transactional activities in the cloud environment. These records are received in various formats, for example formats native to the various data sources 315, IP/domain reputation 320, IP-based geo-location 325, and other security intelligence 330 tools that provide the activity data 310.

The log messages 405 may be received, for example, by parser 410. In one embodiment, parser 410 is subscribed to one or more streams of log messages 405. In one embodiment, parser 410 continually captures log messages 405, and then parses the log messages 405 to extract attributes that are relevant to characterizing behavior of users. For example, parser 410 (or another component) collects log messages 405 from the various activity data sources in the cloud environment, such as servers, networking equipment, applications, and security devices. Parser 410 then converts the various incoming log messages into a uniform, structured format of parsed records 415. For example, parser 410 identifies delimiters (such as commas spaces, or other characters) within the log messages that separate attribute values and/or applies regular expressions to match patterns that represent various attributes, such as usernames, IP addresses, timestamps, etc. Then, parser 410 extracts attribute-value pairs. Parser 410 extracts attribute-value pairs by mapping extracted data values to predefined attributes or fields, such as "username", "event_type", 'timestamp', 'source_ip', etc. In one embodiment, the extracted data are transformed into standard formats, such as a specific date-time format for time stamp. Then, parser 410 writes the paired values into the format of the parsed records 415 as output.

In one embodiment, parsed records 415 are data structures. For example, the format of the parsed records 415 includes a username, followed by an array of attribute value pairs. Individual parsed records 415 are thus each a description—in a uniform, consistent format—of a discrete interaction with the cloud system that are identified with a specific username. Parsed records 415 are presented to filter 420.

In one embodiment, filter 420 may be configured to remove, discard, or otherwise filter out of parsed records 415 individual records that are associated with particular usernames. In a cloud system, in addition to usernames for accounts associated with humans, there may also be usernames for accounts associated with compute instances or other resources of the cloud system. The behavior of these compute resources of the cloud environment is generally not under scrutiny. Filter 420 may therefore be configured to remove records associated with such resources of the cloud environment from the collection of parsed records 415. Filter 420 may be configured with a list of usernames that are associated with cloud system resources that are to be removed from the collection of parsed records 415. Filter 420 thus retains the records associated with human users and excludes the records associated with cloud resources to produce filtered records 425 as output.

In one embodiment, UAP feature builder 430 aggregates the filtered records 425 into user activity pattern (UAP) records 435 associated with a particular interval of time. The filtered records 435 that were generated from log messages 405 occurring within the interval of time are collected as a batch for the particular interval of time, and UAP records 435 are generated for the batch. In one embodiment, an individual UAP record is a collection—in a uniform, consistent format—of the activity associated with an individual username during the interval. A UAP record is a data structure, for example, a UAP record may be a unique username followed by a bag of attribute-value tuples with counts of occurrences of the tuple, such as 'usernameX, Bag {tuple: count, tuple: count, . . . }'. Thus, in one embodiment, UAP records 435 is a set of (filtered) unique usernames that performed activities during the interval and the counts of unique activities performed by those active usernames.

UAP feature builder 430 examines filtered records 425 to extract the set of unique usernames. UAP feature builder 430 generates a UAP record including the unique username and a bag associated with the unique username. UAP feature builder 430 further examines filtered records 425 to determine each unique activity performed by each unique username, as well as a count of the number of times that the unique activity was performed by the username. (Note, a statement herein that an activity was performed "by a username" is a shorthand that indicates that the activity was performed for the account associated with the username.) Then, UAP feature builder 430 generates one or more tuples to represents the one or more unique activities performed by the username. And, UAP feature builder 430 stores the tuples in the bag, along with associated counts of the occurrences of the unique activities represented by the tuples, completing generation of the UAP record. In one embodiment, parser 410, filter 420, and UAP feature builder 430 are component modules of DPFA module 105.

The batch of UAP records 435 generated by UAP feature builder 430 is provided to both (i) KNN sparse similarity builder 440 to create a KNN sparse similarity matrix (KNNSSM) 445, and (ii) random sparse similarity builder 450 to create random sparse similarity matrix (RndSSM) 455.

In one embodiment, KNN sparse similarity builder 440 generates a KNN sparse similarity matrix 445 from the UAP records 435. KNN sparse similarity matrix (KNNSSM) 445 represents edges in a sparse similarity graph of the UAP records 435, in which individual UAP records are nodes linked by edges to a quantity K of neighbor nodes that are nearest in terms of TPA similarity. In one embodiment, the UAP record nodes are stored as rows in a data structure (such as a table) of UAP nodes. In one example, the rows in the data structure of UAP nodes use the unique username as the unique identifier 'row_id' for the node (although other unique identifiers for the UAP record nodes are also contemplated, such as numerical identifiers). In one embodiment, KNNSSM 445 is a data structure that stores the edges as pairs of connected UAP record nodes that are weighted by a TPA similarity between the pair of nodes. For example, the pair of nodes is stored as first 'row_id' of a first UAP record and a second 'row_id' of a second UAP record, and a TPA similarity value between the first and second UAP records 'sim_value'. As discussed above, in one embodiment each UAP record node of the UAP records 435 will be associated with K additional nodes that have highest TPA similarity values. In one embodiment, the KNNSSM 445 is provided to quasi-supervised graph clusterer 460 for identification of clusters within the UAP records 435.

In one embodiment, random sparse similarity builder 450 generates a random sparse similarity matrix 455 from the UAP records 435. Random sparse similarity matrix (RNDSSM) 455, too, represents edges in a sparse similarity graph of the UAP records 435. In RNDSSM 455, though, individual UAP records are nodes linked by edges to a quantity L of randomly selected neighbor nodes. In one embodiment, L is equal to K, although it need not be. In one embodiment, random sparse similarity builder 450 selects the nodes of RNDSSM 455 without regard to the value of TPA similarity, but does calculate and record the values of TPA similarity of each node with the L random neighbor nodes in the RNDSSM 455. As for KNNSSM 445, RNDSSM 455 is a data structure that stores edges as pairs of connected UAP record nodes—first 'row_id' of a first UAP record and a second 'row_id' of a second UAP record—that are weighted by a TPA similarity value 'sim_value' between the pair of nodes. In one embodiment, the RNDSSM 455 is provided to quasi-supervised graph clusterer 460 for identification of clusters within the UAP records 435.

In one embodiment, quasi-supervised graph clusterer (QSGC) 460 accesses the KNNSSM 445 and the RND SSM 455, and assigns the various nodes (rows) of UAP records 435 to initial cluster assignments 465. In one embodiment, QSGC 460 partitions the UAP records nodes of KNNSSM 445 into clusters based on TPA similarity in RNDSSM 455 across the pair of candidate split clusters (as discussed in greater detail above, for example with reference to QSGC module 120). In one embodiment, initial cluster assignments 465 is a data structure that includes, for each UAP record node, an identifier for the node (e.g., 'row_id'), and an identifier for the cluster that the node was placed into by QSGC 460. Initial cluster assignments 465 are provided to cluster number synchronizer 470 for association with previous assignments 475 to clusters.

In one embodiment, cluster number synchronizer 470 accesses initial cluster assignments 465 and previous assignments 475. In one embodiment, the functionality of cluster number synchronizer 470 is performed by SUBGB module 125. In one embodiment, cluster number synchronizer 470 operates to apply the cluster identifiers applied to clusters of users in previous assignments 475 to clusters of users in initial cluster assignments 465 that substantially correspond in terms of pattern of activity. Accordingly, cluster number synchronizer 470 re-uses old cluster identifiers for newly-generated clusters that substantially correspond in terms of user behavior. The clusters therefore maintain a consistent identity in terms of user behavior from batch to batch of user activity data.

For example, cluster number synchronizer 470 identifies overlap in activity patterns for previous cluster assignments 475 and initial cluster assignments 465. In one embodiment, this overlap is determined by a cross-cluster TPA similarity analysis. In this manner, even if no users of a previous cluster iteration recur in a current iteration of the cluster, the TPA similarity of activity between former and present iterations of the cluster will maintain the identity of the cluster. Thus, in one embodiment, cluster number synchronizer 470 determines a TPA similarity of an initially assigned cluster of UAPs with various available previously generated clusters.

For example, cluster number synchronizer 470 selects pairs of UAPs from the newly generated cluster and the previously generated cluster, respectively, and calculates an average TPA similarity between the pairs as the TPA similarity between the clusters. Where the TPA similarity between the clusters is highest, the cluster number synchronizer 470 assigns the cluster ID of the most similar previously generated cluster to the initially assigned cluster of UAPs. Note, the assignment may be subject to a minimum threshold of similarity, such as a TPA similarity value above 0.8, or in another embodiment a TPA similarity value above 0.9. The newly-generated initial cluster assignments that have TPA similarity below the threshold for all the previously generated clusters will not be assigned a cluster ID of a previously generated cluster. Instead, cluster number synchronizer 470 will assign a new cluster ID to the newly generated cluster.

Then, cluster number synchronizer 470 applies the previously assigned cluster identifiers to corresponding clusters (with highest TPA similarity) in the initial cluster assignments 465 to generate final cluster assignments 480. Final cluster assignments 480 is a data structure including a unique user name 'usernameX' and an assigned cluster identifier 'cluster_ID' for the users that interacted with the cloud environment during the interval of time. The assigned cluster identifiers in final cluster assignments 480 maintains consistent behavioral identity from previous assignments 475, enabling cluster membership to be tracked from interval to interval (batch to batch) of user activity.

Example Behavioral Group Anomaly Detection Based on UBPAS

In one embodiment, quasi-supervised graph clustering with automated stopping at a maximum number of dissimilar clusters (as performed by QSGC module 120) may be applied to create behavioral groups of users. The quasi-supervised graph clustering is used to create the behavioral groups based on observed activities of the users. Users that have similar activities are clustered into the behavioral groups. The quasi-supervised graph clustering characterizes behavior of users at a group level. The activity types associated with the groups may be identified, for example, a group may be representative of administrators, a group of regular users, users of particular applications, etc. The quasi-supervised graph clustering analysis is repeated at intervals of time to place the users into the behavioral groups.

Users may be clustered into behavioral groups based on activity profile, and the membership of the users in the behavioral groups may be tracked over time. As new batches of activity data 310 are received, clustering process is repeated to update the clusters. In general, the behavioral groups are stable from batch to batch. For example, there may be a cluster representing administrators, a cluster representing some developers, a cluster representing users of a particular application, and so on. The users do not generally change their activities so as to be moved from one cluster to another.

The quasi-supervised graph clustering analysis can be used for detecting malicious activities in the cloud. Movement of users from one behavioral group to another from a first time to a later time may be indicative of a compromised account, stolen credentials, hacking, etc. Such cluster-hopping presents an opportunity to detect anomalous user behavior. For example, a user account logged into the system under regular user credentials, but performing actions consistent with administrators (and not consistent with regular users) would move from the behavioral group of regular users to the behavioral group of administrator users in iterative clusterings. And, where a new cluster is formed in addition to existing groups, just to encompass the activity of an individual user, this may also be considered anomalous user behavior.

These anomalous transitions between behavior groupings may trigger an electronic alert or other electronic message. The alert, in turn, can initiate automated actions to mitigate the risk, such as automatically forcing a logout or otherwise terminating a session of the anomalous user account, automatically requiring multi-factor authentication on subsequent login by the anomalous user account, or automatic update or even revocation of access privileges of the anomalous user account. Further, the alert may initiate an automatic notification to a security team, or initiate generation of a report describing the anomalous behavior.

Note that it is impossible to be sure in advance how many behavioral groups there are among the collective users of a computing system, so there is no way to pre-specify the number of clusters. While some systems may have just a handful of users, some systems, especially cloud computing systems, have thousands or even millions of distinct users. There is no deterministic equation that can determine the number of clusters based on the number of users.

Figure 5:
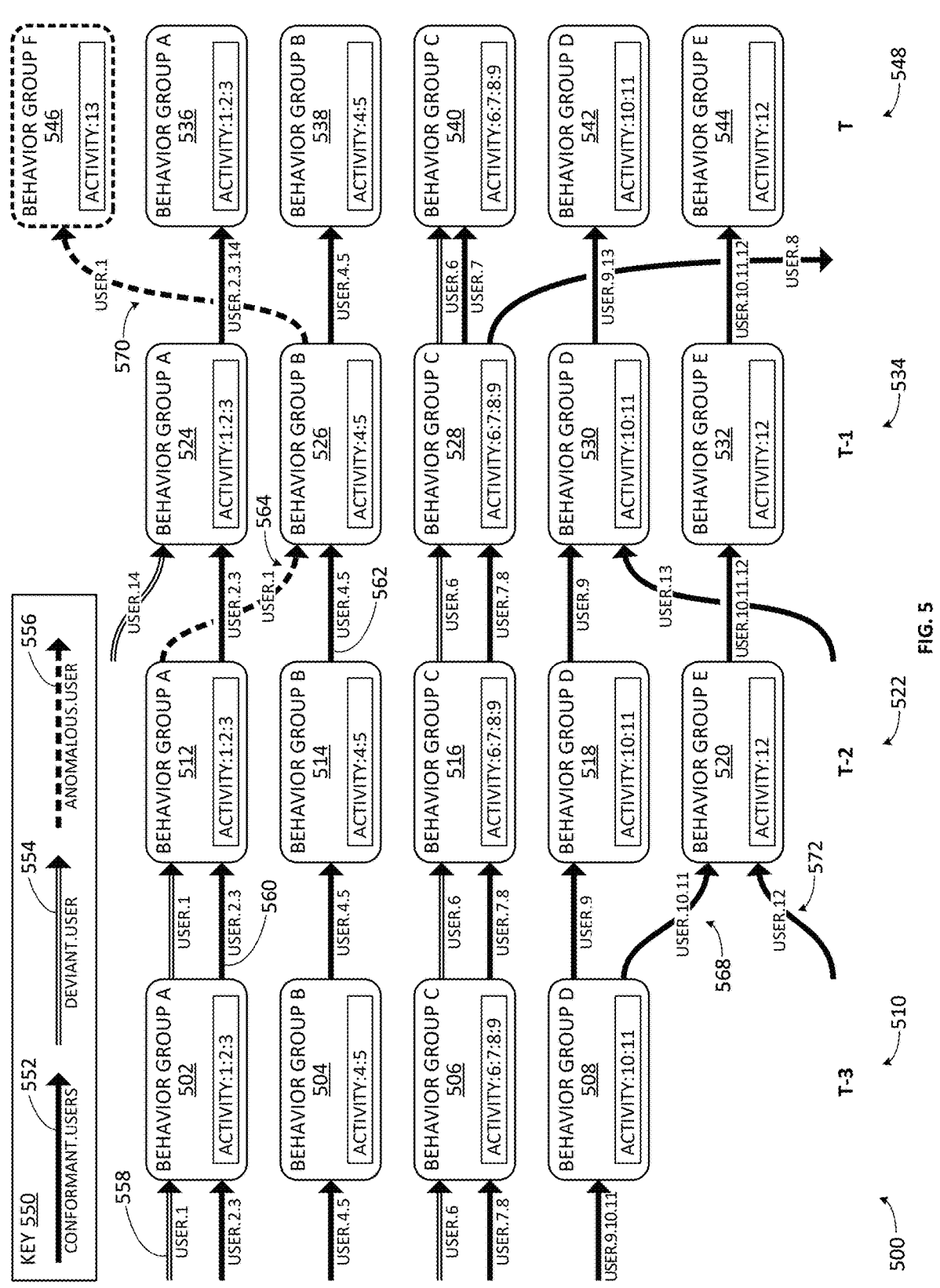
FIG. 5 illustrates a chart of example UAP assignments to SUBGs 500 in an example of behavior anomaly detection based on the quasi-supervised clustering of user behavior patterns.

FIG. 5 illustrates a chart of example UAP assignments to SUBGs 500 in an example of behavior anomaly detection based on the quasi-supervised clustering of user behavior patterns. Chart 500 shows various behavioral clusters of users as the clusters evolve over intervals of time. More particularly, chart 500 shows behavioral clusters resulting from the UBPAS 100 analysis of batches of user activity data for four successive intervals of time, T-3, T-2, T-1, and T.

The behavioral clusters for the batch of activity data collected for previous interval T-3-behavior group A 502, behavior group B 504, behavior group C 506, behavior group D 508—are shown in first column 510. The behavioral clusters for the batch of activity data collected for previous interval T-2-behavior group A 512, behavior group B 514, behavior group C 516, behavior group D 518, and behavior group E 520—are shown in second column 522. The behavioral clusters for the batch of activity data collected for previous interval T-1-behavior group A 524, behavior group B 526, behavior group C 528, behavior group D 530, and behavior group E 532—are shown in third column 534. The behavioral clusters for the batch of activity data collected for current interval T-behavior group A 536, behavior group B 538, behavior group C 540, behavior group D 542, behavior group E 544, and behavior group F 546—are shown in fourth column 548.

In one embodiment, the behavior groups are sustainable user behavior groups (SUBGs) because the groups sustain or maintain a persistent identity in terms of the activities of their users across multiple time intervals (and associated batches of user activity). For example, the performance of activities 1, 2, and 3 by users in behavior group A 502, 512, 524, 536 persists across T-3 510, T-2 522, T-1 534, and T 548.

Key 550 indicates various types of behavioral labels assigned to users based on their activities and memberships in behavioral clusters: Conformant users 552, deviant users 554, and anomalous users 556. Key 550 indicates line styles for paths of user membership from cluster to cluster that are associated with the behavioral labels.

Conformant users 552 are those users that perform activities that that are consistent with those of other users in the cluster. In one embodiment, conformant users 552 are regarded with low suspicion by a UEBA system. In one embodiment, alerts are not generated in response to a user being classified as conformant.

Deviant users 554 are those users that perform activities that are partially consistent with those of other users in the cluster, but not so different as to be placed in a different cluster. A deviant user may, for instance, be an outlier within a behavioral cluster with respect to other users in the behavioral cluster. In one embodiment, deviant users 554 in a behavior group may be identified by analyzing the UAP records in the behavior groups with various outlier identification techniques. Example outlier identification techniques include z-score analysis and one-class support vector machine (SVM) analysis. Z-score analysis identifies as outliers the UAP records within a behavioral cluster that have a number z of standard deviations from the mean of the cluster that is beyond a pre-determined threshold (such as a threshold of |3| standard deviations). One-class support vector machine analysis learns to find a boundary that encompasses conformant users 552, while excluding deviant users 554, for example based on training with activities of conformant users in previous iterations of a cluster.

In one embodiment, deviant users 554 are regarded with moderate suspicion by a UEBA system. In one embodiment, deviant users 554 may be activities of a malicious user that has compromised the account of a legitimate user overlapping with the activities of the legitimate user. Labeling users 554 thus provides a degree of early warning against slow-developing attacks on the cloud environment. An electronic alert to the presence of a deviant user may therefore be issued in response to detecting a user to be anomalous.

And, anomalous users 556 are those users that perform activities that either (i) cause the user to be classified successively in different behavioral cluster after first being classified as deviant users, or (ii) cause the user to be classified by itself in a new behavioral cluster. In one embodiment, anomalous users 556 are regarded with high suspicion by a UEBA system. An anomalous user is thus behaving in a manner that is either progressively more suspicious or is entirely different from other users of the cloud system. An electronic alert to the presence of a deviant user may therefore be issued in response to detecting a user to be anomalous.

Consider the case of User.1 558. In interval T-3 510, User.1 558 is clustered into behavior group A 502, although the activity of User.1 558 differs sufficiently from the behavior within behavior group A of performing activities 1, 2, and 3 to cause User.1 558 to be labeled as a deviant user. In interval T-2 522, User.1 558 continues to behave in a manner that deviates from that of other members of behavior group A 512, User.2. and User.3 560. In interval T-1 534, the behavior of User.1 558 changes so drastically away from that of performing activities 1, 2, and 3 like User.2. and User.3 560 (and toward performing activities 4 and 5 like User.4. and User.5 562), that User.1 558 transitions 564 away from behavior group A 524 and is instead clustered into behavior group B 526. Because User.1 558 was previously labeled a deviant user of behavior group A 512 in interval T-2 522, and because User.1 558 is now clustered into behavior group B 526 in interval T-1 534, User.1 558 is now labeled an anomalous user. An electronic alert to the presence of an anomalous user may be issued in response to detecting User.1 to be anomalous in interval T-1 534.

Contrast the transition 564 of User.1 558 from behavior group A 524 to behavior group B 526 with a transition 568 of User.10 and User.11 from behavior group D 508 to behavior group E 520. The activity of User.10 and User.11 was not previously considered to be deviant. Accordingly, the transition 568 does not cause the behavior of User.10 and User.11 to be considered anomalous.

Further, in interval T, User.1 558 has behaved so unusually that User.1 can no longer be clustered with other users. Instead, UBPAS transitions 570 User.1 558 into a separate behavioral cluster—behavior group F 546—that is dedicated to the activities of User 1. Placing a user into its own dedicated cluster is sufficient in itself to be considered anomalous, regardless of whether prior activities of the user were considered deviant or conformant. Because User.1 558 is, in interval T 548, clustered into behavior group F 546 by itself, User.1 558 is again labeled an anomalous user. An electronic alert to the presence of an anomalous user may be issued in response to detecting User.1 to be anomalous in interval T 548.

Contrast transition 570 of user 1 into its own dedicated behavior group F with transition 568 of User.10 and User.11 from behavior group D 508 to behavior group E 520. User.10 and User.11 are both performing new activity 12, as is conformant User.12 572. Because these users are not being clustered individually into clusters dedicated to their respective activities, but are instead each performing activity 12, User.10 and User.11 are still considered conformant, despite changing clusters.

In response to the alert of an anomalous user (or even of a deviant user), a UEBA system may force the logout of the anomalous user, and require the anomalous user to log in to the cloud system before allowing the anomalous user to continue use of the system. The UEBA system may enforce a multi-factor authentication on login after detection of a user as anomalous. The UEBA system may further require the re-registration of credentials of the anomalous user before allowing the user to log in to the cloud system.

In one embodiment, the UBPAS clustering and behavioral group anomaly detection analysis repeat in a batch loop for a continual series of time intervals. Depending on the desired response time for alerting to deviant activity and anomalous activity, the time interval covered by a batch may be longer or shorter. For example, in a near-real-time implementation, a time interval of only a few minutes, such as an interval of between one and minutes, ensures that the anomalous activity of users is rapidly detected. In other implementations, the intervals may be larger, such as intervals on the order of an hour, or daily.

Example Test

One embodiment of UBPAS-based detection of anomalous behavior was tested using a sample dataset. The dataset contained user log messages over the course of 1 day, with the log messages having multiple attributes. For demonstration purposes, one attribute was chosen as the basis for clustering. The raw log messages into the DPFA module. The DPFA module produced a dataset with 975 unique users automatically extracted from the messages.

Each row of the dataset produced by the DPFA module is UAP record-a set of sets representing attribute values extracted from the input raw messages. In these UAP records, the attributes are encoded into integers using a dictionary. The dataset was fed into the KNNSGB and RNDSGB. The sparse matrices (KNNSSM and RNDSSM) output from the KNNSGB and RNDSGB were further fed into the QSGC module for clustering with the quasi-supervised clustering method described herein. The QSGC module automatically identified 26 clusters in the input dataset. The resulting clusters had the following number of members in each cluster: clusterSizes: [15, 23, 93, 57, 1, 1, 1, 177, 60, 121, 1, 10, 1, 14, 1, 1, 1, 61, 13, 9, 236, 62, 13, 1, 1, 1].

Optionally, the system can be configured to produce more fine-grained behavioral clustering groups by further clustering large groups using the quasi-supervised clustering method described herein. For example, further clustering of group #20 (having 236 members) resulted in 12 subclusters with the following sizes: clusterSizes2: [40, 22, 43, 14, 3, 35, 34, 1, 26, 7, 1, 10]. The decision to proceed to identification of further sub-clusters may be based on a ratio of the size of a cluster to the size of the overall dataset. For example, clusters that are larger than 1/10 of the size of the dataset may be automatically analyzed for internal sub-clusters to further granularize the behavioral analysis.

Automatically identified clusters and subclusters by the disclosed quasi-supervised clustering procedure produced very relevant grouping of users based on the attribute values representing user activities.

To show the improvement of the quasi-supervised clustering technique over prior clustering methods (such as clustering algorithms based on finding unconnected partitions of the graph corresponding to the KNN-sparse similarity matrix), clustering with the clean cut objective was performed on the sample dataset. The clustering obtained 3 clusters with the following number of members in each cluster: cleancut clusterSizes: [973, 1, 1]. Such a solution is useless as it put practically all rows of the dataset into a single cluster, and ignored real distinctions between data points.

Cloud or Enterprise Embodiments

In one embodiment, the present system (such as UBPAS system 100) is a computing/data processing system including a computing application or collection of distributed computing applications for access and use by other client computing devices that communicate with the present system over a network. In one embodiment, UBPAS system 100 is a component of a time series data service that is configured to gather, serve, and execute operations on time series data. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions. In one embodiment, UBPAS system 100 is a centralized server-side application that provides at least the functions disclosed herein and that is accessed by many users by way of computing devices/terminals communicating with the computers of UBPAS system 100 (functioning as one or more servers) over a computer network. In one embodiment UBPAS system 100 may be implemented by a server or other computing device configured with hardware and software to implement the functions and features described herein.

In one embodiment, the components of UBPAS system 100 may be implemented as sets of one or more software modules executed by one or more computing devices specially configured for such execution. In one embodiment, the components of UBPAS system 100 are implemented on one or more hardware computing devices or hosts interconnected by a data network. For example, the components of UBPAS system 100 may be executed by network-connected computing devices of one or more computing hardware shapes, such as central processing unit (CPU) or general-purpose shapes, dense input/output (I/O) shapes, graphics processing unit (GPU) shapes, and high-performance computing (HPC) shapes.

In one embodiment, the components of UBPAS system 100 intercommunicate by electronic messages or signals. These electronic messages or signals may be configured as calls to functions or procedures that access the features or data of the component such as for example application programming interface (API) calls. Other electronic messages, such as log messages, may be delivered through message queues or event streams for transferring messages from a component that is publishing the log messages to one or more components that are subscribed to the queue or stream. Further, electronic messages may include direct database queries and responses to various SQL and NoSQL databases, such as graph databases.

In one embodiment, these electronic messages or signals are sent between hosts in a format compatible with transmission control protocol/internet protocol (TCP/IP) or other computer networking protocol. Components of UBPAS system 100 may (i) generate or compose an electronic message or signal to issue a command or request to another component, (ii) transmit the message or signal to other components of UBPAS system 100, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, remote computing systems may access information or applications provided by UBPAS system 100, for example through a web interface server. In one embodiment, the remote computing system may send requests to and receive responses from UBPAS system 100. In one example, access to the information or applications may be effected through use of a web browser on a personal computer or mobile device. In one example, communications exchanged with UBPAS system 100 may take the form of remote representational state transfer (REST) requests using JavaScript object notation (JSON) as the data interchange format for example, or simple object access protocol (SOAP) requests to and from XML servers. The REST or SOAP requests may include API calls to components of UBPAS system 100.

Software Module Embodiments

In general, software instructions are designed to be executed by one or more suitably programmed processors accessing memory. Software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

Computing Device Embodiment

Figure 6:
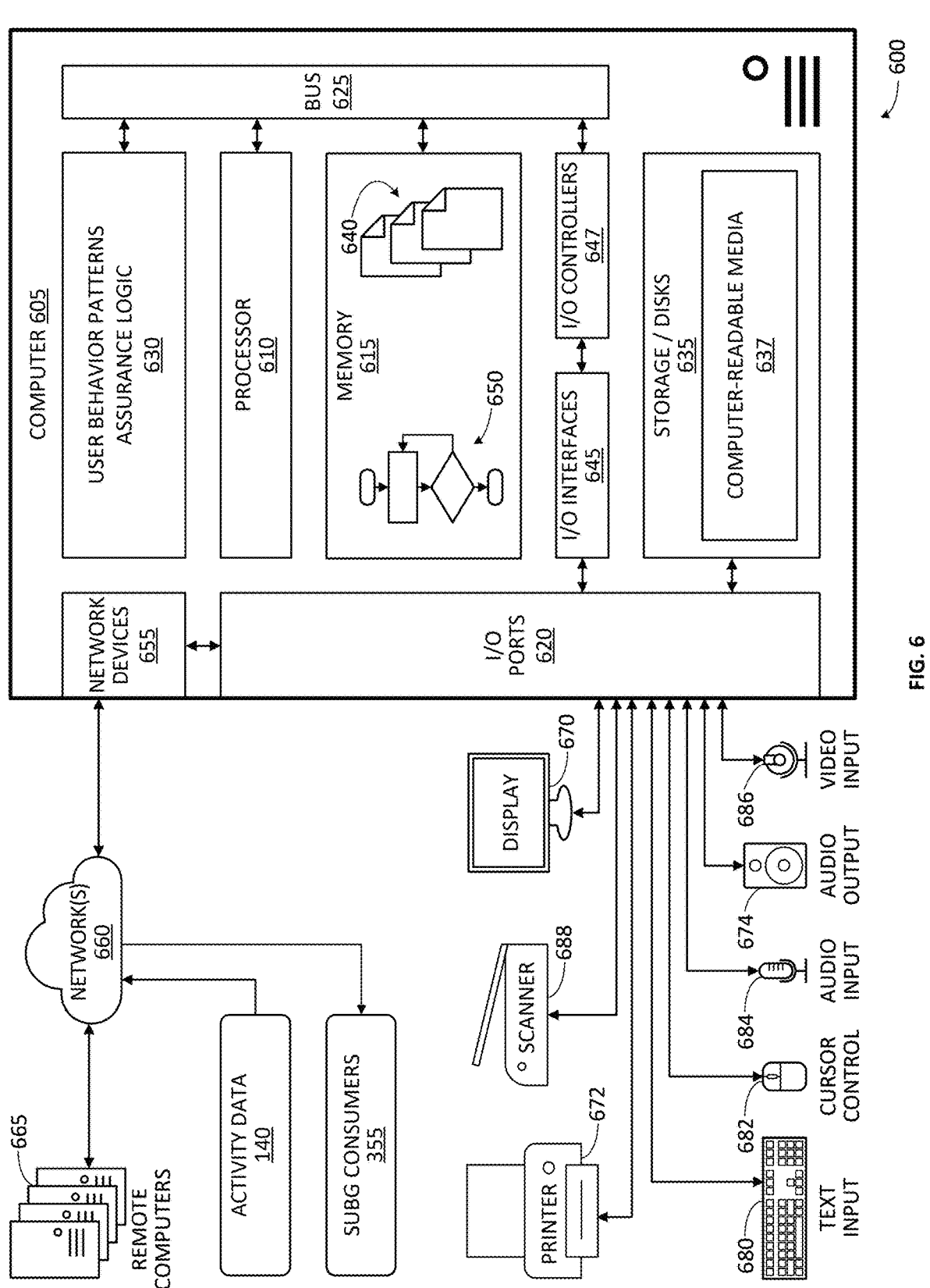
FIG. 6 illustrates an embodiment of a computing system configured with the example systems and/or methods disclosed.

FIG. 6 illustrates an example computing system 600 that is configured and/or programmed as a special purpose computing device(s) with one or more of the example systems and methods described herein, and/or equivalents. The example computing device may be a computer 605 that includes at least one hardware processor 610, a memory 615, and input/output ports 620 operably connected by a bus 625. In one example, the computer 605 may include user behavior patterns assurance (UBPAS) logic 630 configured to facilitate quasi-supervised clustering of user activity profiles for detection of threats to cloud systems, similar to the systems, methods, and other embodiments shown in and described with respect to FIGS. 1-5 above.

In different examples, the logic 630 may be implemented in hardware, one or more non-transitory computer-readable media 637 with stored instructions, firmware, and/or combinations thereof. While the logic 630 is illustrated as a hardware component attached to the bus 625, it is to be appreciated that in other embodiments, the logic 630 could be implemented in the processor 610, stored in memory 615, or stored in disk 635.

In one embodiment, logic 630 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application-specific integrated circuit (ASIC) programmed to facilitate quasi-supervised clustering of user activity profiles for detection of threats to cloud systems. The means may also be implemented as stored computer executable instructions that are presented to computer 605 as data 640 that are temporarily stored in memory 615 and then executed by processor 610.

Logic 630 may also provide means (e.g., hardware, non-transitory computer-readable medium that stores executable instructions, firmware) for performing one or more of the disclosed functions and/or combinations of the functions.

Generally describing an example configuration of the computer 605, the processor 610 may be a variety of various processors including dual microprocessor and other multiprocessor architectures. A memory 615 may include volatile memory and/or non-volatile memory. Non-volatile memory may include, for example, read-only memory (ROM), programmable ROM (PROM), and so on. Volatile memory may include, for example, random access memory (RAM), static RAM (SRAM), dynamic RAM (DRAM), and so on.

A storage disk 635 may be operably connected to the computer 605 via, for example, an input/output (I/O) interface (e.g., card, device) 645 and an input/output port 620 that are controlled by at least an input/output (I/O) controller 647. The disk 635 may be, for example, a magnetic disk drive, a solid-state drive, a floppy disk drive, a tape drive, a Zip drive, a flash memory card, a memory stick, and so on. Furthermore, the disk 635 may be a compact disc ROM (CD-ROM) drive, a CD recordable (CD-R) drive, a CD rewritable (CD-RW) drive, a digital video disc ROM (DVD ROM) drive, and so on. The storage/disks thus may include one or more non-transitory computer-readable media. The memory 615 can store a process 650 and/or a data 640, for example. The disk 635 and/or the memory 615 can store an operating system that controls and allocates resources of the computer 605.

The computer 605 may interact with, control, and/or be controlled by input/output (I/O) devices via the input/output (I/O) controller 647, the I/O interfaces 645, and the input/output ports 620. Input/output devices may include, for example, one or more network devices 655, displays 670, printers 672 (such as inkjet, laser, or 3D printers), audio output devices 674 (such as speakers or headphones), text input devices 680 (such as keyboards), cursor control devices 682 for pointing and selection inputs (such as mice, trackballs, touch screens, joysticks, pointing sticks, electronic styluses, electronic pen tablets), audio input devices 684 (such as microphones or external audio players), video input devices 686 (such as video and still cameras, or external video players), image scanners 688, video cards (not shown), disks 635, and so on. The input/output ports 620 may include, for example, serial ports, parallel ports, and USB ports.

The computer 605 can operate in a network environment and thus may be connected to the network devices 655 via the I/O interfaces 645, and/or the I/O ports 620. Through the network devices 655, the computer 605 may interact with a network 660. Through the network 660, the computer 605 may be logically connected to remote computers 665. Networks with which the computer 605 may interact include, but are not limited to, a local area network (LAN), a wide area network (WAN), and other networks. In one embodiment, computer 705 may receive activity data 140 (such as log messages 405) through network 660. In one embodiment, computer 605 may transmit clusterings (such as SUBGs) to SUBG consumers 355 through network 660.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a micropro-cessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed func-tions. In one embodiment, logic may include one or more gates, combinations of gates, or other circuit components configured to perform one or more of the disclosed func-tions. Where multiple logics are described, it may be pos-sible to incorporate the multiple logics into one logic. Similarly, where a single logic is described, it may be possible to distribute that single logic between multiple logics. In one embodiment, one or more of these logics are corresponding structure associated with performing the dis-closed and/or claimed functions. Choice of which type of logic to implement may be based on desired system condi-tions or specifications. For example, if greater speed is a consideration, then hardware would be selected to imple-ment functions. If a lower cost is a consideration, then stored instructions/executable application would be selected to implement the functions. Logic is limited to statutory sub-ject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combina-tions of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computing system, comprising:
at least one processor connected to at least one memory;
one or more non-transitory computer-readable media that include stored thereon computer-executable instruc-tions that when executed by at least the processor cause the computing system to:
generate first similarity values for one or more nearest neighbors of each data point of a plurality of data points, and wherein an individual data point of the plurality characterizes a pattern of activity associated with an account;
generate second similarity values for one or more random neighbors of each data point of the plurality of data points;
recursively split the plurality of data points into clusters based on the first similarity values of the nearest neighbors;
stop the recursive splitting when the data points are split into a total of N clusters based on the second similarity values of the random neighbors, wherein the value of N is not set prior to the recursive splitting;
evaluate the N clusters to detect that the individual data point has changed clusters in a manner indicative of an anomalous change to the pattern of activity; and
generate an electronic alert that the pattern of activity has changed anomalously.

2. The computing system of claim 1, wherein the com-puter-executable instructions to stop the recursive splitting when the data points are split into a total of N clusters further cause the computing system to determine to stop the recur-sive splitting because a cross-cluster similarity between candidate clusters is greater than zero.

3. The computing system of claim 1, wherein the com-puter-executable instructions further cause the computing system to assign to a first of the N clusters an identifier of a prior cluster that is associated with a prior pattern of activity, wherein the assignment is based on a value of tri-point arbitration similarity between the first of the N clusters and the prior cluster, wherein the individual data point has changed clusters from the prior cluster to a second of the N clusters that is associated with the pattern of activity.

4. The computing system of claim 1, wherein the com-puter-executable instructions further cause the computing system to determine whether or not prior activity of the account was an outlier in a prior cluster.

5. The computing system of claim 1, wherein the first similarity values and the second similarity values are tri-point arbitration similarity values in a range between nega-tive one indicating complete dissimilarity, and positive one indicating complete similarity.

6. The computing system of claim 1, wherein the com-puter-executable instructions to generate the first similarity values and to generate the second similarity values further cause the computing system to generate one or more indi-vidual similarity values by:
determining a first distance between a data point of the plurality of data points and a neighbor of the data point;

determining a second distance between the data point and an arbiter point that is representative of the plurality of data points, wherein the arbiter point is a point other than the data point and the neighbor;

determining a third distance between the neighbor and the arbiter point;

determining a difference between (i) a least distance of the first distance and the second distance and (ii) the third distance;

determining a maximum distance of the third distance and the least distance; and generating the individual similarity value to be the ratio of the difference to the maximum distance.

7. The computing system of claim 6, wherein the first distance, second distance, and third distance are each Jaccard distances.

8. One or more non-transitory computer-readable media that include stored thereon computer-executable instructions that when executed by at least a processor of a computer system cause the computer system to:

build a first sparse similarity matrix by generating first similarity values for one or more nearest neighbors of each data point of a plurality of data points, and wherein an individual data point of the plurality characterizes a pattern of activity associated with an account;

build a second sparse similarity matrix by generating second similarity values for one or more random neighbors of each data point of the plurality of data points;

iteratively cluster the plurality of data points into clusters based on one or more of the first similarity values of the nearest neighbors in the first sparse similarity matrix;

quasi-supervise the iterative clustering based on one or more of the second similarity values of the random neighbors in the second sparse similarity matrix to stop the iterative clustering when the data points are split into a total of N clusters, wherein the value of N is not determined prior to the iterative clustering;

evaluate the N clusters to detect that the individual data point has changed clusters in a manner indicative of anomalous activity; and generate an electronic alert that the anomalous activity is associated with the account.

9. The non-transitory computer-readable media of claim 8, wherein the computer executable instructions to quasi-supervise the iterative clustering to stop the iterative clustering when the data points are split into the total of N clusters further cause the computer system to determine that a value of cross-cluster similarity between candidate clusters indicates that the candidate clusters are similar.

10. The non-transitory computer-readable media of claim 9, wherein the computer executable instructions to quasi-supervise the iterative clustering to stop the iterative clustering when the data points are split into the total of N clusters further cause the computer system to determine that the candidate clusters are similar by:

determining a set of cross-cluster pairs of data points for the candidate clusters, wherein each pair of data points has a first data point in a first of the candidate clusters and a second data point in a second of the candidate clusters;

aggregating the second similarity values that are associated with the cross-cluster pairs into a cross-cluster similarity value; and detecting that the cross-cluster similarity value is positive to determine that the candidate clusters are similar.

11. The non-transitory computer-readable media of claim 8, wherein the computer-executable instructions further cause the computing system to assign to a first of the N clusters an identifier of a prior cluster that is associated with a prior pattern of activity, wherein the individual data point has changed clusters from the prior cluster to a second of the N clusters that is associated with the pattern of activity.

12. The non-transitory computer-readable media of claim 8, wherein the computer-executable instructions further cause the computing system to determine that prior activity of the account was classified as deviant with respect to a prior cluster, wherein the manner indicative of the anomalous activity is based at least in part on the deviance of prior activity of the account.

13. The non-transitory computer-readable media of claim 8, wherein the computer-executable instructions to generate the first similarity values and to generate the second similarity values further cause the computing system to generate one or more individual similarity values by:

determining a first distance between a data point of the plurality of data points and a neighbor of the data point;

determining a second distance between the data point and an arbiter point that is representative of the plurality of data points, wherein the arbiter point is a point other than the data point and the neighbor;

determining a third distance the neighbor and the arbiter point;

determining a difference between (i) a least distance of the first distance and the second distance and (ii) the third distance;

determining a maximum distance of the third distance and the least distance; and generating the individual similarity value to be the ratio of the difference to the maximum distance.

14. The non-transitory computer-readable media of claim 8, wherein the first similarity values and the second similarity values are generated based at least in part on Jaccard distances.

15. A computer-implemented method, comprising:

generating a plurality of data points from a batch of electronic messages that describe electronic activity during a current interval of time, wherein the individual data points of the plurality characterize patterns of the electronic activity associated with respective individual accounts;

building a first sparse similarity matrix using first similarity values for one or more nearest neighbors of each data point of the plurality of data points;

building a second sparse similarity matrix using second similarity values for one or more random neighbors of each data point of the plurality of data points;

recursively partitioning the plurality of data points into clusters based the first sparse similarity matrix;

halting the recursive partitioning at a total of N clusters when the N clusters have no subclusters that are dissimilar from each other based on the second sparse similarity matrix, wherein the value of N is not set prior to the recursive partitioning;

detecting in the N clusters that one of the individual data points has switched clusters in the current interval of time with respect to a prior iteration of clusters for a prior interval of time; and generating an electronic alert that a pattern of the electronic activity has changed for an account associated with the one of the individual data points.

16. The computer-implemented method of claim 15, wherein the step of halting the recursive partitioning at a total of N clusters further comprises determining that the subclusters are similar by:

determining a set of cross-cluster pairs of data points for the subclusters, wherein each pair of data points has a first data point in a first of the subclusters and a second data point in a second of the subclusters;

aggregating the second similarity values that are associated with the cross-cluster pairs into a cross-cluster similarity value; and detecting that the cross-cluster similarity value is positive.

17. The computer-implemented method of claim 15, further comprising maintaining identity of clusters from a prior plurality of data points by:

searching for prior clusters of the prior plurality of data points that correspond in pattern of activity to the N clusters, wherein a given prior cluster corresponds to one of the N clusters where a cross-cluster similarity value generated by tri-point arbitration satisfies a threshold;

assigning to those of the N clusters for which one of the prior clusters correspond in pattern of activity a cluster identifier that was assigned to the corresponding prior cluster; and generating new cluster identifiers for those of the N clusters that do not have a corresponding prior cluster.

18. The computer-implemented method of claim 15, further comprising:

determining that prior activity of the account in the prior iteration of time was an outlier in one prior cluster of the prior iteration of clusters; and determining that the switch in clusters by the individual data point was anomalous because the prior activity was an outlier.

19. The computer-implemented method of claim 15, further comprising generating the first similarity values and the second similarity values by tri-point arbitration.

20. The computer-implemented method of claim 15, further comprising generating the first similarity values and the second similarity values based on Jaccard distances between each of (i) a data point of the plurality of data points and a neighbor of the data point, (ii) the data point and an arbiter point that is representative of the plurality of data points, wherein the arbiter point is a point other than the data point and the neighbor, and (iii) the neighbor and the arbiter point.

\*  \*  \*  \*  \*